(12) United States Patent
Todasco

(10) Patent No.: US 10,122,843 B2
(45) Date of Patent: *Nov. 6, 2018

(54) CONVERSATION ASSISTANCE SYSTEM

(71) Applicant: PayPal, Inc., San Jose, CA (US)

(72) Inventor: Michael Charles Todasco, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/495,719

(22) Filed: Apr. 24, 2017

(65) Prior Publication Data
US 2017/0230496 A1 Aug. 10, 2017

Related U.S. Application Data

(63) Continuation of application No. 14/869,558, filed on Sep. 29, 2015, now Pat. No. 9,635,167.

(51) Int. Cl.
*H04M 3/42* (2006.01)
*H04M 1/725* (2006.01)
(Continued)

(52) U.S. Cl.
CPC ....... *H04M 1/72569* (2013.01); *G10L 15/005* (2013.01); *G10L 15/22* (2013.01);
(Continued)

(58) Field of Classification Search
CPC ......... H04M 1/72569; H04M 3/42221; H04M 3/493; H04M 2201/40; H04M 2242/12; H04M 2250/12; H04M 2250/60; H04M 3/42; H04W 4/206; H04W 4/20; G01L 15/005; G01L 15/22; G10L 25/48
(Continued)

(56) References Cited

U.S. PATENT DOCUMENTS 8,649,776 B2 2/2014 Tofighbakhsh et al.
8,787,006 B2 7/2014 Golko et al.
(Continued)

OTHER PUBLICATIONS

Matthew Bret MacLaurin; "Biometric Systems and Methods for Authentication and Determination of Group Characteristics;" U.S. Appl. No. 14/586,853, filed Dec. 30, 2014; 43 Pages.
(Continued)

*Primary Examiner* — Mong-Thuy Tran
(74) *Attorney, Agent, or Firm* — Haynes and Boone, LLP

(57) ABSTRACT

Systems and methods for providing conversation assistance include receiving from at least one user device of a user, conversation information and determining that the conversation information is associated with a conversation involving the user and a first person that is associated with first conversation assistance information in a non-transitory memory. Body measurement data of the user is retrieved from the at least first user device. A need for conversation assistance in the conversation involving the user and the first person is detected using the body measurement data. First conversation assistance information associated with the first person is retrieved from the non-transitory memory. The first conversation assistance information associated with the first person is provided through the at least one user device.

20 Claims, 19 Drawing Sheets

(51) Int. Cl.
*H04W 4/20* (2018.01)
*G10L 15/00* (2013.01)
*G10L 15/22* (2006.01)
*G10L 25/48* (2013.01)

(52) U.S. Cl.
CPC .............. *G10L 25/48* (2013.01); *H04W 4/20* (2013.01); *H04M 3/42* (2013.01); *H04M 2201/40* (2013.01); *H04M 2242/12* (2013.01); *H04M 2250/12* (2013.01); *H04M 2250/60* (2013.01)

(58) Field of Classification Search
USPC ............................................ 455/414.2, 414.1
See application file for complete search history.

(56) References Cited

U.S. PATENT DOCUMENTS

| | | | | |
|---|---|---|---|---|
| 9,137,308 | B1* | 9/2015 | Petrou | H04L 67/12 |
| 9,202,171 | B2 | 12/2015 | Kuhn | |
| 9,609,117 | B2* | 3/2017 | Davis | H04M 1/72569 |
| 9,779,088 | B2* | 10/2017 | Jephcott | G06F 17/289 |
| 2007/0133437 | A1 | 6/2007 | Wengrovitz et al. | |
| 2008/0070593 | A1 | 3/2008 | Altman et al. | |
| 2009/0051648 | A1* | 2/2009 | Shamaie | G06F 3/017 |
| | | | | 345/156 |
| 2009/0324022 | A1 | 12/2009 | Sangberg et al. | |
| 2010/0178903 | A1* | 7/2010 | Tofighbakhsh | G06F 17/30867 |
| | | | | 455/414.3 |
| 2010/0219936 | A1 | 9/2010 | Gabara | |
| 2011/0119593 | A1 | 5/2011 | Jacobson et al. | |
| 2012/0019557 | A1 | 1/2012 | Aronsson et al. | |
| 2012/0079018 | A1 | 3/2012 | Rottler et al. | |
| 2012/0226622 | A1 | 9/2012 | Gonzalez et al. | |
| 2012/0253782 | A1 | 10/2012 | Ariga et al. | |
| 2013/0024577 | A1 | 1/2013 | Krishnaswamy et al. | |
| 2013/0044130 | A1 | 2/2013 | Geisner et al. | |
| 2013/0066634 | A1 | 3/2013 | Soliman et al. | |
| 2013/0159003 | A1 | 6/2013 | Kim et al. | |
| 2013/0169682 | A1 | 7/2013 | Novak et al. | |
| 2013/0174213 | A1 | 7/2013 | Liu et al. | |
| 2014/0108501 | A1 | 4/2014 | Papakipos et al. | |
| 2014/0145936 | A1 | 5/2014 | Gu et al. | |
| 2014/0198956 | A1 | 7/2014 | Forutanpour et al. | |
| 2014/0272821 | A1 | 9/2014 | Pitschel et al. | |
| 2014/0288436 | A1 | 9/2014 | Venkatraman et al. | |
| 2014/0330900 | A1 | 11/2014 | Libin et al. | |

OTHER PUBLICATIONS

"Find My Friends on the App Store;" 2015; Apple Inc.; pp. 1-3; https://itunes.apple.com/us/app/find-my-friends/id466122094?mt=8.

Erika Jonietz; "Augmented Identity;" MIT Technology Review; Feb. 23, 2010; pp. 1-2; http://www.technologyreview.com/news/417655/augmented-identity/.

Yi Chen; "Augmented Reality Glasses Help You Remember People's Names—PSFK;" Feb. 23, 2012; pp. 1-8; http://www.psfk.com/2012/02/augmented-reality-glasses.html.

Brian Barrett; "The Facial Recognition Augmented Reality App That Could Revolutionize Stalking;" Feb. 15, 2010; Augmented Reality; pp. 1-6; http://gizmodo.com/5472251/the-facial-recognition-augmented-reality-app-that-could-revolutionize-stalking#.

* cited by examiner

CONVERSATION ASSISTANCE SETTINGS

CONVERSATION HISTORY SETTINGS

| LAST CONVERSATION | | INFO TYPE 462 |
|---|---|---|
| Time 458 | Setting 460 | |
| within last month | all | wife<br>children |
| over 1 month | social | name<br>wife<br>children |
| over 1 month | business | name<br>employer<br>job title |

SAVE

- 402
- 404
- 454
- 456a
- 456b
- 456c

FIRST USER DEVICE 204

FIGURE 4D

CONVERSATION ASSISTANCE INFORMATION TABLE OF FIRST USER 530

| NAME 534 | TIME 536 | LOCATION 538 | EVENT 540 | JOB TITLE 542 | EMPLOYER 544 | WIFE 546 | CHILDREN 548 | DESCRIPTION 550 |
|---|---|---|---|---|---|---|---|---|
| DONALD | 3/1/2015 | JOHN'S HOUSE | JOHN'S BIRTHDAY PARTY | DIRECTOR | EMPLOYER A | ABBY | ANDREA AND STEVE | HOBBY: SKI |
| DONALD | 08/1/2013 | RESORT A | JOHN'S WEDDING | MANAGER | EMPLOYER A | ABBY | ANDREA | FAVORATE FOOD: THAI |

532a → (row 1)
532b → (row 2)

CONVERSATION ASSISTANCE INFORMATION DATABASE 506

FIGURE 5C

CONVERSATION ASSISTANCE INFORMATION TABLE OF FIRST USER

| NAME 534 | TIME 536 | LOCATION 538 | EVENT 540 | JOB TITLE 542 | EMPLOYER 544 | WIFE 546 | CHILDREN 548 | DESCRIPTION 550 |
|---|---|---|---|---|---|---|---|---|
| DONALD | 09/01/2015 | CONVENTION CENTER A | CONFERENCE A | DIRECTOR | EMPLOYER B | ABBY | ANDREA, STEVE, AND JENNIFER | JENNIFER WAS BORN IN JUNE, 2015 |
| DONALD | 3/1/2015 | JOHN'S HOUSE | JOHN'S BIRTHDAY PARTY | DIRECTOR | EMPLOYER A | ABBY | ANDREA AND STEVE | HOBBY: SKI |
| DONALD | 08/1/2013 | RESORT A | JOHN'S WEDDING | MANAGER | EMPLOYER A | ABBY | ANDREA | FAVORATE FOOD: TAI |

CONVERSATION ASSISTANCE INFORMATION DATABASE 506

FIGURE 9

CONVERSATION ASSISTANCE SYSTEM

CROSS REFERENCED TO RELATED APPLICATIONS

This application is a continuation of U.S. application Ser. No. 14/869,558, filed on Sep. 29, 2015, and issued as U.S. Pat. No. 9,635,167 on Apr. 25, 2017, the contents of which are incorporated by reference in its entirety.

BACKGROUND

Field of the Disclosure

The present disclosure generally relates to mobile communication networks, and more particularly to a conversation assistance system that may provide conversation assistance to users using mobile communication devices.

Related Art

People can now communicate and interact with more people than ever before. To keep in contact with friends, business associates, and/or other relationships, people are increasingly joining social networks and sharing various types of information via those social networks. For example, people may share family information with others that they are connected to via friend networks such as, for example, those provided by FACEBOOK®, and share business information with others that they are connected to via business networks such as, for example, those provided by LINKEDIN®.

However, while people are more connected than ever before, it can sometimes be hard for a person to remember the name or other information of another person when interacting with that other person (e.g., particularly when that interaction is unexpected or the previous connection was brief or distant), which can make it difficult or awkward to start or carry on a conversation. Conventional solutions to this problem include the person attempting to search the Internet to retrieve for information about the other person (e.g., from a social network) on a portable device. However, such searches are time consuming and can interrupt a conversation that has already begun with the other person.

Thus, there is a need for a conversation assistance system that addresses the issues detailed above.

BRIEF DESCRIPTION OF THE FIGURES

FIG. 4D is a screen shot illustrating an embodiment of a user device displaying a conversation assistance settings screen;

FIG. 5C is a schematic view illustrating an embodiment of a conversation assistance information database in a conversation assistance system;

FIG. 9 is a schematic view illustrating an embodiment of a conversation assistance information database in a conversation assistance system;

Figure 1:
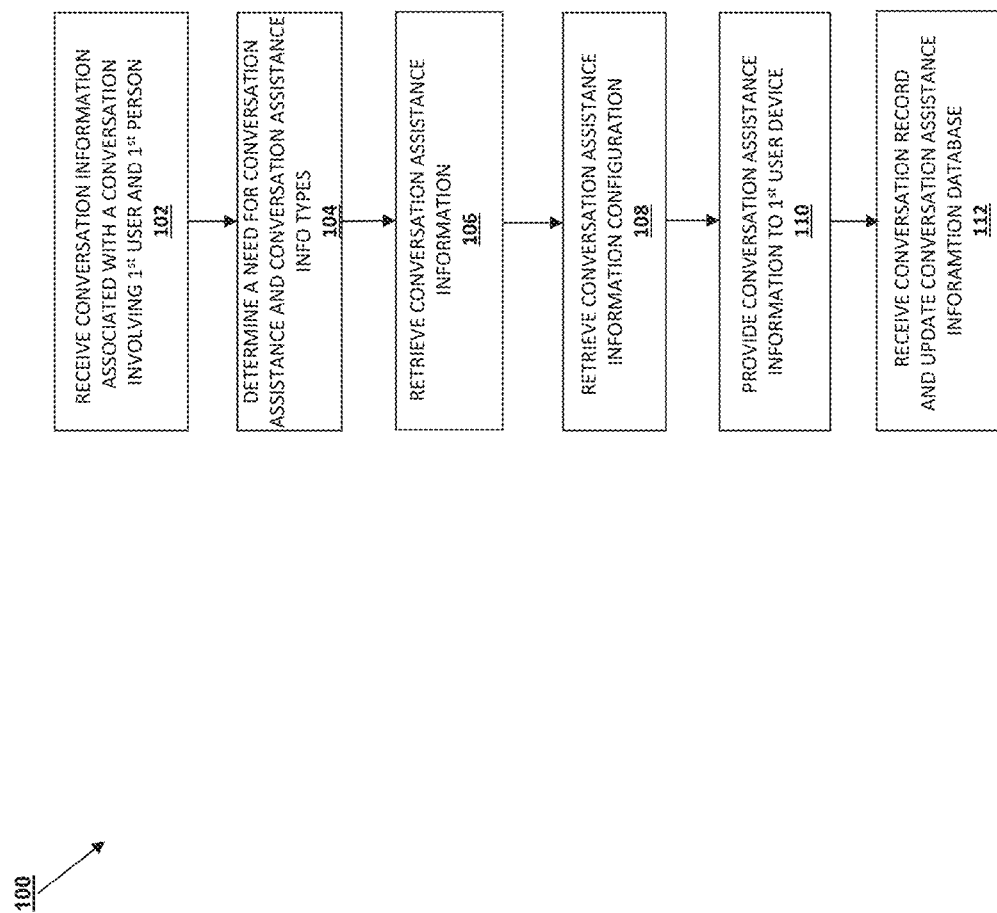
FIG. 1 is a flow chart illustrating an embodiment of a method for providing conversation assistance.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for providing conversation assistance to a user for a conversation involving the user and at least one other person. Various user devices may be used during a conversation by the user with a person, and may be configured to capture conversation information, including body measurement data of the user. In some embodiments, the body measurement data may include heart rate data, temperature data, and/or perspiration data. The conversation information from the user devices may be determined to be associated with a conversation involving the user and the first person, and may be used to automatically detect that the user needs conversation assistance in the conversation. Information types of conversation assistance information that the user needs may then be automatically and dynamically determined. For example, it may be determined that the user needs information about the family of a first person when the first person starts to talk about his family. Determined conversation assistance information may then be retrieved and provided to the user. In some embodiments, the conversation assistance information is provided according to a conversation assistance information configuration. In one example, the conversation assistance information configuration may provide for the display of an image that is associated with the name of the first person in order to help the user remember the first person's name. However, these embodiments are meant to be merely exemplary, and one of skill in the art will recognize that a variety of modifications may be made to the conversation assistance system discussed below without departing from the scope of the present disclosure.

Referring now to FIG. 1, an embodiment of a method 100 for providing conversation assistance is provided. The method 100 begins at block 102 where conversation information associated with a conversation is received from an at least one first user device used by a first user. Various embodiments of one or more user devices may be used during a conversation, and the first user device may be configured to capture the conversation information associated with the conversation by itself and/or via communication with others of the user devices. In some embodiments, the conversation information may include body measurements data (e.g., heart rate data, temperature data, perspiration rate data, and/or any other data that may be captured via body measurements), gesture information (e.g., interaction gesture information, hand gesture information, and/or other gesture information), audio information, location data, and/or a variety of other information that may be used to identify, characterize, and otherwise analyze the conversation. At block 102, in some embodiments, the first user device may save the conversation information and/or send the conversation information over a network such as, for example, the Internet. For example, the first user device may send the conversation information to a system provider device that operates to provide the conversation assistance system (e.g., a conversation assistance system provider device operated by a conversation assistance system provider, a third-party system provider device operated by a third-party system provider, and/or any other provider of the conversation assistance system). However, in some embodiments, the conversation assistance functionality discussed below may be performed by the first user device without the need for a network connected system provider device.

Figure 2:
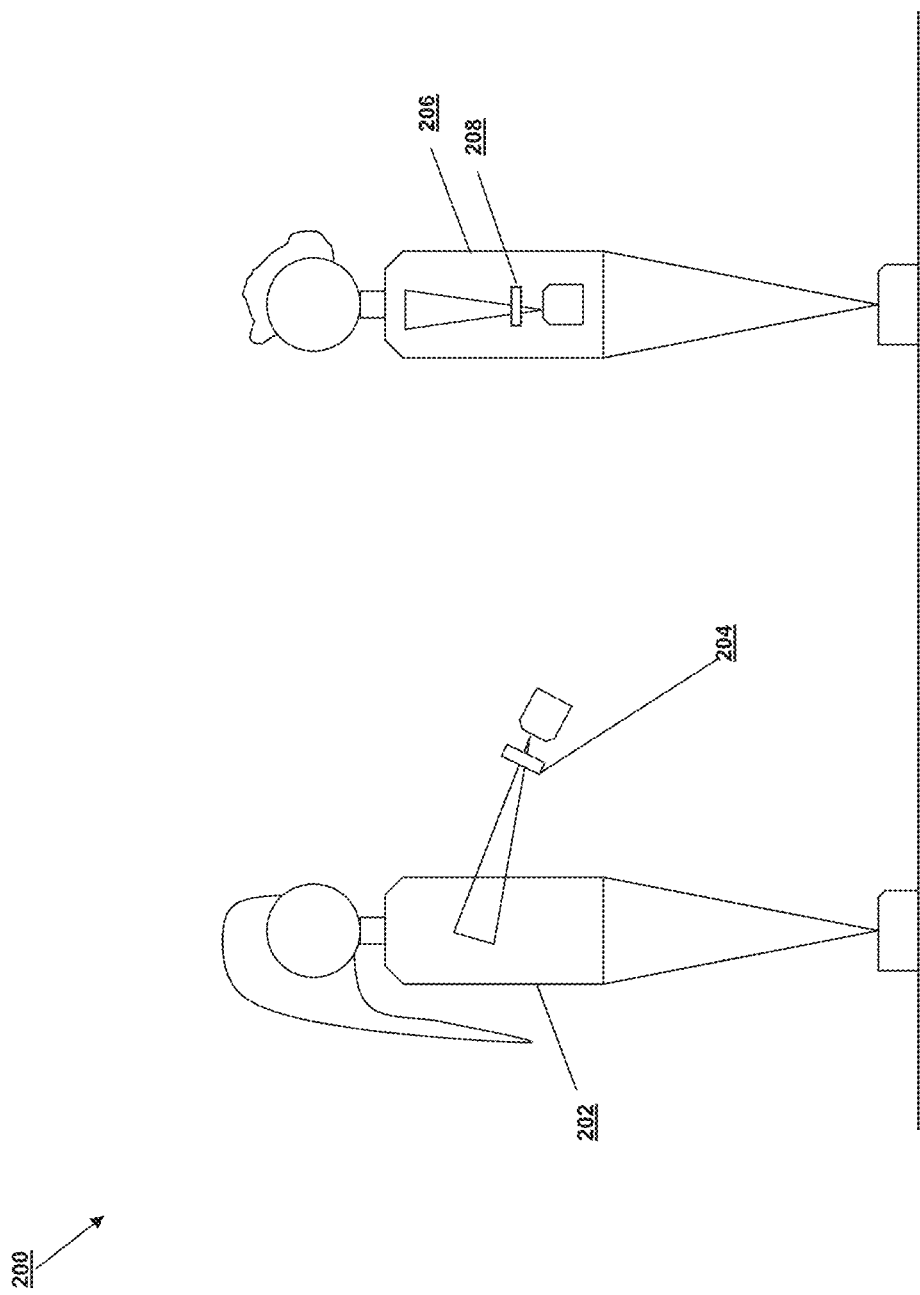
FIG. 2 is a schematic view illustrating an embodiment of a user device being used by a user in a conversation involving the user and a first person.

Referring now to FIG. 2, an embodiment of a first user device being used in a conversation is illustrated. In the embodiment illustrated in FIG. 2, only one person other than the first user is illustrated as a participant of a conversation. However, in some embodiments, multiple persons other than the first user may participate in a conversation, which will be discussed in detail below with reference to FIG. 8. As illustrated in the embodiment of FIG. 2, a first user device 204 is being used by a first user 202 during a conversation 200 with a first person 206 that, in the illustrated embodiment, uses a broadcast user device 208.

In the illustrated embodiment of FIG. 2, the first user device 204 and the broadcast user device 208 are wearable devices (e.g. smart watches such as, for example, the Apple Watch® available from Apple Inc. of Cupertino, Calif.). However, the first user device 204 and the broadcast user device 208 may be other types of devices (e.g., other wearable devices such as smart glasses, mobile devices such as phones, etc.) while remaining within the scope of the present disclosure. In some embodiments, the broadcast user device 208 may be substantially similar to the first user device 204. In some embodiments, the broadcast user device 208 may be a device of a type that is different from the first user device 204. In some embodiments, one or more first user devices 204 may be used by the first user 202 (e.g., a plurality of wearable devices, one or more wearable devices and a mobile phone, etc.). In some embodiments, the first user 202 may be in a position during the conversation (e.g., facing the first person 206) such that the first user device 204 (e.g., smart glasses) may capture images and/or gestures of one or both of the first user 202 and the first person 206.

Figure 3:
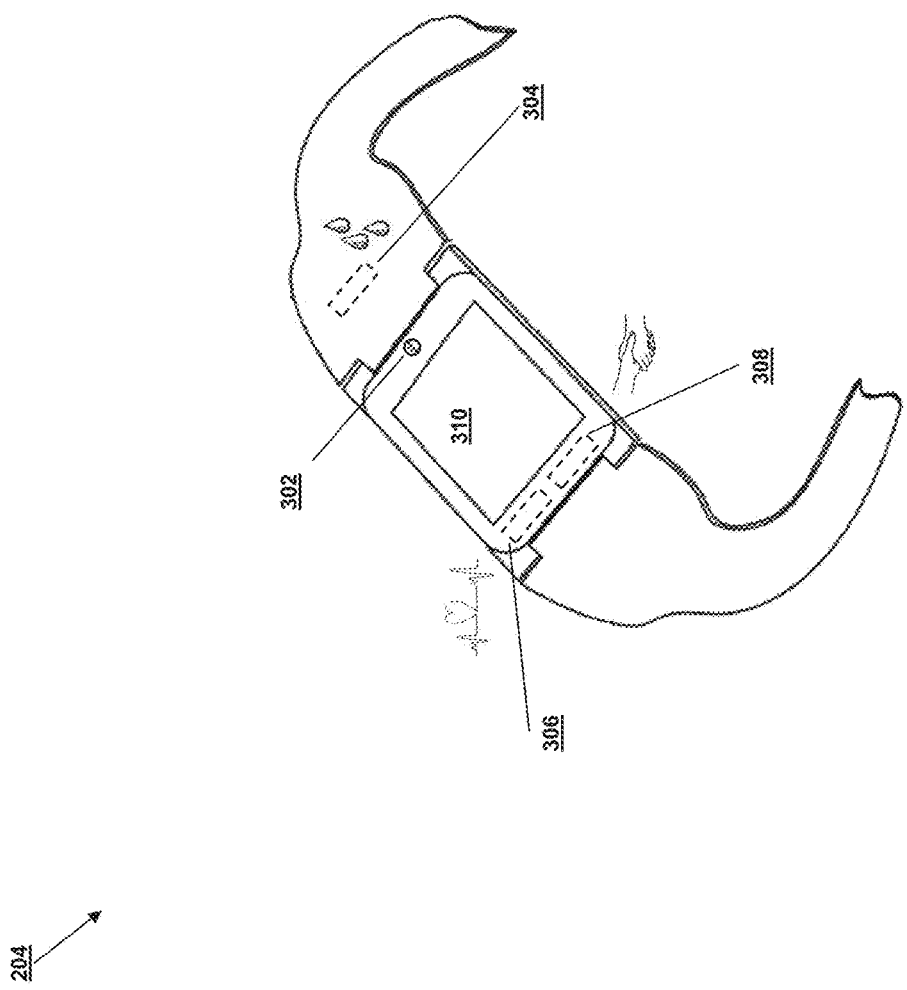
FIG. 3 is a perspective view illustrating an embodiment of a user device.

FIG. 3 illustrates an embodiment of a first user device 204 that may be used in conversation 200 by the first user 202. As illustrated in the embodiment of FIG. 3, the first user device 204 includes a camera 302, a perspiration sensor 304, a heart rate sensor 306, a motion sensor 308, and a display 310. The first user device 204 may also include a Global Positioning System (GPS) device, an accelerometer, a temperature sensor, a microphone, a wireless communications device, and/or any other subsystems that may be utilized to capture the conversation information described herein.

In some embodiments, the first user 202 may instruct the first user device 204 when to begin capturing the conversation information (e.g., via a voice command, a selection of a physical or graphical input, etc.). In some embodiments, the first user device 204 may continuously capture the conversation information at an event (e.g., a birthday party, a business conference) where conversations may occur based on, for example, recognition of the event in a user's calendar, based on a location and publicly available information on the Internet, etc. In some embodiments, the first user device 204 may be informed (e.g., by the first user 202) or may automatically recognize the beginning of a conversation 200 (e.g., based on detected audio, detected gestures, and/or other conversation initiator information known in the art), and in response, may begin capturing conversation information until the first user device 204 determines that conversation 200 has ended (e.g., via detected audio, detected gestures, and/or other conversation ending information known in the art).

In some embodiments, the conversation information may include location data indicating the location of the first user 202. In some embodiments, the first user device 204 provides location data based on the location of the first user 202 and/or the first user device 204. For example, the first user device 204 may include a location determination device (e.g., a Global Positioning System (GPS) device, a cell tower triangulation device, a Wi-Fi location determination device, and/or a variety of other location determination devices known in the art) to determine location data related to a current location of the first user device 204. For example, the first user device 204 may be a mobile phone or wearable device that changes locations as the first user 202 moves, and may provide the current location of the first user using the location determination device discussed above. In some embodiments, the first user 202 may be prompted by the first user device 204 to provide its current location. In some embodiments, a system provider device may retrieve the conversation information that includes the location determined by the first user device 204 over the network.

In some embodiments, the conversation information may include body measurement data of the first user 202. For example, the first user device 204 may provide perspiration data of the first user 202 captured by the perspiration sensor 304 of the first user device 204. In another example, the first user device 204 may provide heart rate data of the first user 202 using a heart rate sensor 306 of the first user device 204. In yet another example, the first user device 204 may provide temperature data of the first user 202 using a temperature sensor of the first user device 204. While a few specific examples of body measurement data have been described, one of skill in the art in possession of the present disclosure will recognize that any of a variety of body measurements may be made and provided by the first user device 204 while remaining within the scope of the present disclosure.

In some embodiments, the conversation information may include audio information that captures one or more statements (e.g., spoken by the first user 202 and/or the first person 206) during a conversation 200. In some embodiments, the first user device 204 may be configured to receive audio information from the first user 202 and/or the first person 206. For example, a microphone or other audio capturing system in the first user device 204 may be configured to capture audio information of statements made by one or both of the first user 202 and the first person 206. In some embodiments, a speech recognition engine (e.g., provided by a processing system executing instructions on a memory system) in the first user device 204 may be configured to analyze the audio information to recognize the corresponding statements. While the analysis of the audio information to recognize the statements has been discussed as being performed in the first user device 204, in some embodiments, the audio file may be sent to the system provider device and then analyzed by a speech recognition engine in the system provider device to determine the corresponding statements while remaining within the scope of the present disclosure.

In some embodiments, the conversation information may include gesture information corresponding to a gesture of the first user 202 and/or the first person 206. In some embodiments, the gesture information may include interaction gesture information corresponding to an interaction gesture (e.g., a handshake, a hug, a bow, a kiss on the cheek, and/or other interaction gestures known in the art). In one example, the interaction gesture may be a gesture of the first user requesting interaction with the first person 206 (e.g., a gesture to request a handshake by extending the right hand towards the first person 206). In some embodiments, the gesture information may include hand gesture information corresponding to a hand gesture (e.g., an "ok" hand gesture using a thumb and a forefinger of the hand) of the first user 202 or the first person 206. In one example, the hand gesture may be made by extending a specific number of fingers in a direction parallel to a top surface of the first user device 204.

In some embodiments, the first user device 204 may capture gesture information corresponding to gestures provided by the first user 202 and/or the first person 206. For example, a camera 302 in the first user device 204 may capture an image or video corresponding to gestures of the first user 202 and/or the first person 206. In another example, a motion sensor 308 (e.g., an accelerometer) in the first user device 204 worn on the wrist of the first user 202 may capture movement data (e.g., up-and-down motion indicative of hand shaking) associated with a gesture (e.g., a handshake). In some embodiments, a gesture recognition engine (e.g., in the first user device 204, service provider device, or any other device) may be configured to analyze the gesture information including the images, videos, motion data, and/or other gesture information to determine the gesture performed by the first user 202 and/or the first person 206.

In some embodiments, the first user device 204 may include other sensors such as position sensors, muscle tension sensors, network communication devices, and/or a variety of other sensors known in the art that may be used to determine and transmit conversation information, and as such may provide other functions related to conversation 200. In an example, a muscle tension sensor may be used to capture gesture information corresponding to a gesture (e.g., gripping a hand during a handshake). In another example, a wireless communication device in the first user device 204 may be used to transmit and receive information (e.g., conversation information over the network).

A variety of devices may be suitable for implementing the first user device 204. As discussed above, the first user device 204 may be a wearable device (e.g. Google Glass® available from Google Inc. of Mountain View, Calif.; Apple Watch® available from Apple Inc. of Cupertino, Calif.; etc.). However, in another example, the first device 204 may be a mobile phone or other mobile computing device known in the art. One of skill in the art will recognize a variety of other portable/mobile user devices and/or wearable user devices may be utilized, in at least some embodiments, without departing from the scope of the present disclosure.

In some embodiments, the first user 202 may use the first user device 204 to provide the system provider device with first user information of the first user 202 over the network. For example, first user information of the first user 202 may include a user name, a user identification number, a user account number, a user password, login information of various social networks, and/or a variety of other information known in the art for associating the first user 202 with a first user account. In some embodiments, the first user 202 may sign into an account with the system provider device before or during conversation 200.

In some embodiments, similar to the first user device 204, the broadcast user device 208 may be used by the first person 206 to provide the system provider device with first person information of the first person 206 over the network. As such, the first user device 204 may receive first person information of the first person 206 from broadcast user device 208, and send the received first person information of the first person 206 to the service provider device. In one example, the first user device 204 may be configured to receive information broadcast by the broadcast user device 208 when the first user device 204 is within a predetermined distance of the broadcast user device 208 (e.g., a conversation distance of approximately 4 feet). In another example, the first user device 204 may receive the first person information of the first person 206 from the broadcast user device 208 when the first user 202 is within the broadcast range of the broadcast user device 208. In another example, the first user device 204 may receive the first person information of the first person 206 from broadcast user device 208 when the first person 206 provides an instruction to do so (e.g., by pointing a hand or the broadcast user device 208 in the direction of the first user 202). In another example, the first user device 204 may receive the first person information of the first person 206 from broadcast user device 208 when the first user 202 is associated with the first person 206 (e.g., the first user 202 is associated with the first person 206 via a social network by a second degree connection).

Thus, in some embodiments, the system provider device may receive conversation information associated with a conversation involving the first user 202 and first person 206, along with user information that is associated with a user account and/or first person information that is associated with the first person account.

While a few example of the conversation information received from the first user device 204 have been provided, one of skill in the art in possession of the present disclosure will recognize that a wide variety of systems and methods for providing, receiving, storing, determining, and/or otherwise communicating conversation information at block 102 will fall within the scope of the present disclosure.

Referring now to FIGS. 1 and 4A-4D, the method 100 then proceeds to block 104, where a need for conversation assistance and conversation assistance information types (also referred to below as information types) is determined, for example, according to the received first conversation information, the body measurement data, conversation assistance settings, and/or any of the other information described herein.

In some embodiments, the conversation assistance settings may be default conversation assistance settings provided by the conversation assistance system, while in other embodiments, the conversation assistance settings may be configured by the first user 202. As discussed below, the conversation assistance settings may include body measurement settings, region settings, language settings, interaction gesture settings, hand gesture settings, audio settings, and/or settings for any other information that may be captured, determined, and/or otherwise utilized in the conversation assistance system.

In some embodiments, conversation assistance settings include body measurement settings. In some embodiments, body measurement data may indicate that a user needs or desires conversation assistance. For example, particular body measurements such as an increased heart rate, increased perspiration, increased body temperature, and/or other indications of user anxiety may indicate that a user is nervous or anxious. The detection of such nervousness and/or anxiousness in combination with determinations that a conversation has begun may be indicative that the user is beginning a conversation with a person whose name (or other important information) they have forgotten or otherwise should know.

Figure 4A:
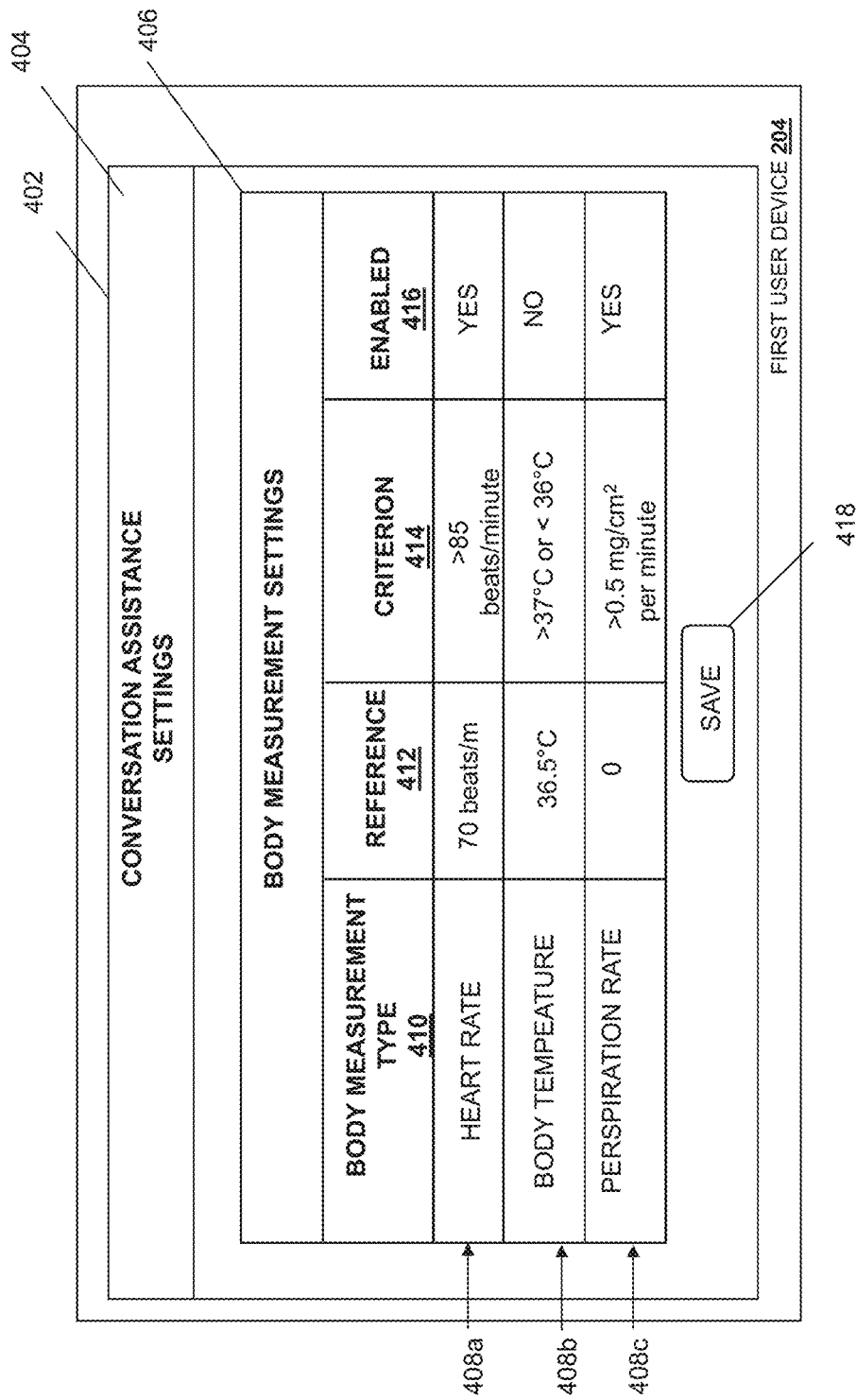
FIG. 4A is a screen shot illustrating an embodiment of a user device displaying a conversation assistance settings screen.

Referring now to FIG. 4A, an embodiment of a first user device displaying a conversation assistance settings screen is illustrated. As illustrated in FIG. 4A, the first user device 204 includes a display 402 displaying a conversation assistance settings screen 404 that includes a body measurement settings section 406. The body measurement settings section 406 may include body measurement settings 408a, 408b, and 408c, each of which includes a body measurement type 410, a reference 412, a criterion 414, and an enablement status 416. In the particular example illustrated in FIG. 4A, for example, the body measurement setting 408a includes a body measurement type of heart rate, a reference of 70 beats every minute, a criterion of greater than 85 beats per second, and an enablement status of "YES". In another example, the body measurement setting 408b includes a body measurement type of body temperature, a reference of 36.5° C., a criterion of greater than 37° C. or less than 36° C., and an enablement status of "NO." In another example, the body measurement setting 408c includes a body measurement type of perspiration rate, a reference of 0, a criterion of greater than 0.5 milligram per square centimeter per minute, and an enablement status of "YES".

In some embodiments, the first user device 204 may determine references 412 of the body measurement settings 408a-c according to body measurement data captured when the first user 202 does not need or want conversation assistance. For example, references 412 may be determined according to body measurement data captured when the first user 202 is not engaged or is not about to engage in a conversation, or alternatively and/or in combination with, the first user 202 engaging or about to engage in a conversation, but not in need of conversation assistance. In some embodiments, the first user device 204 may determine criteria 414 of body measurement settings 408 during a training period with a training set of body measurement data, which may be captured during previous conversation(s) where the first user 202 indicates that conversation assistance is needed. The criteria 414 may be based on an average of the training set, the lowest and/or highest value of the training set, and/or other criterion determination methods known in the art.

In some embodiments, body measurement settings 408 may be associated with or adjusted according to environmental factors (e.g., a time of day, the ambient temperature, humidity, and/or other environmental factors known in the art). For example, body measurement settings may be associated with a time of day, and include a morning body measurement setting, an afternoon body measurement setting, and an evening body measurement setting, each of which may be used based on the time of the conversation 200. In another example, the captured body measurement data may be adjusted according to a time of day to reduce possible error caused by environment factors. In some embodiments, the first user 202 may configure the body measurement settings 408 to, for example, disable or enable a particular body measurement setting. Using the specific example of the conversation assistance settings illustrated in FIG. 4A, if the first user 202 would like to save the conversation assistance settings including body measurement settings 408a, 408b, and 408c (e.g., on the first user device 204, on the system provider device 502, or any other device), the first user 202 may select the "SAVE" choice 418 in the body measurement settings section 406.

In some embodiments, body measurement settings 408 may be updated according to the first user 202's feedback regarding any conversation. For example, the first user device 204 may detect that conversation 200 ends (e.g., according to audio information that includes the statement "goodbye"), send a feedback request to the first user 202, and receive feedback from the first user 202. In another example, the first user device 204 may automatically detect feedback from the first user 202 (e.g., according to audio information that includes the statement "conversation assistance is not needed"). In some embodiments, the first user device 204 may update the body measurement settings 408 according to the feedback received from the first user 202. In one example, the feedback may indicate that the first user 202 did not need conversation assistance in conversation 200 when the heart rate of the first user 202 was between 87 and 97 beats per minute. Accordingly to the feedback, the first user device 204 may update the criterion of the body measurement setting 408a to be greater than 97 beats every minute.

Figure 4B:
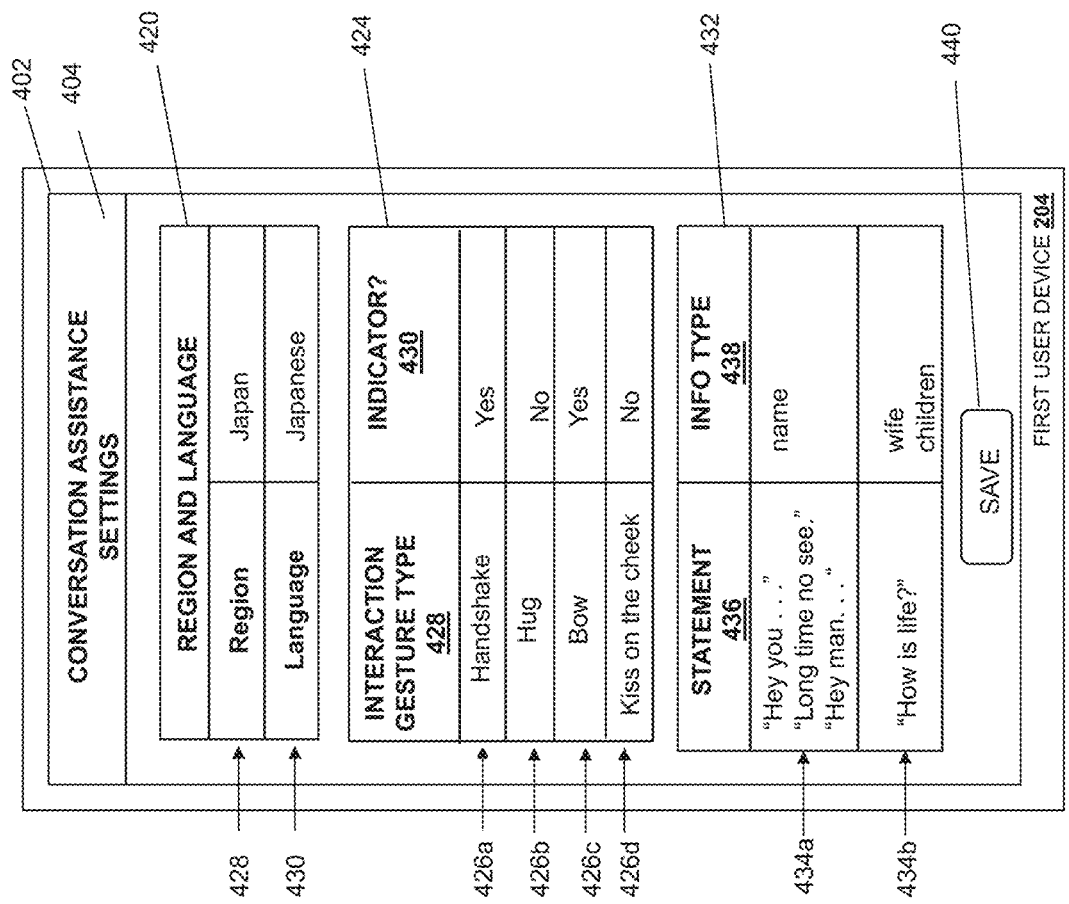
FIG. 4B is a screen shot illustrating an embodiment of a user device displaying a conversation assistance settings screen.

In some embodiments, conversation assistance settings may include a region setting and a language setting. Referring now to FIG. 4B, an embodiment of a first user device displaying a conversation assistance settings screen is illustrated. As illustrated in FIG. 4B, the first user device 204 includes a display 402 displaying a conversation assistance settings screen 404 that includes a region and language section 420 including a region setting 428 (e.g., "Japan") and a language setting 430 (e.g., "Japanese"). In different embodiments, the region setting 428 and/or language setting 430 may be automatically determined by the first user device 204 using the location data of the conversation information, or be provided by the first user 202 (e.g., "Japanese" for a special event involving Japanese guest). In some embodiments, a speech recognition engine (e.g., in the first user device 204, service provider device, or any other device) may recognize the language of the audio information in conversation information, and the first user device 204 may automatically configure the language setting 430 according to the recognized language.

In some embodiments, conversation assistance settings may include interaction gesture settings. As illustrated in FIG. 4B, in some embodiments, the conversation assistance settings screen 404 may include an interaction gesture settings section 424, which includes interaction gesture settings 426a, 426b, 426c, and 426d. Each interaction gesture setting 426a-d may include an interaction gesture type 428 and an indicator status 430. For example, as illustrated in FIG. 4B, the interaction gesture settings 426a and 426c provide interaction gesture types (e.g., handshake, bow) indicating a need for conversation assistance according to the indicator status of "Yes". On the other hand, the interaction gesture settings 426b and 426d provide interaction gesture types (e.g., hug, kiss on the cheek) that do not indicate a need for conversation assistance according to the indicator status of "No". In some embodiments, some interaction gesture settings 426 (e.g., interaction gesture setting 426c associated with a bow) are automatically provided by the first user device 204 (e.g., according to greeting etiquette associated with a region setting 428 of Japan). In some embodiments, some interaction gesture settings 426 are configured by the first user 202, for example, according to the first user 202's personal greeting preferences.

In some embodiments, conversation assistance settings may include audio settings. As illustrated in FIG. 4B, the conversation assistance settings screen 404 includes an audio settings section 432 providing statements indicating a need for conversation assistance and/or information types needed by the first user 202. Audio settings section 432 may include audio settings 434a and 434b, each of which may include at least one statement and an information type 438. In the example illustrated in FIG. 4B, the audio setting 434a includes statements "Hey you . . . ," "Long time no see," and "Hey man . . . ," which correspond to an information type for the name of the first person 206 involved in conversation 200. In another example, the audio setting 434b includes a statement "How is life" corresponding to an information type for the wife and children of the first person 206 involved in conversation 200. In some embodiments, some audio settings (e.g., an audio setting including a statement "Konnichiwa") may be automatically provided by the first user device 204, for example, according to greeting etiquette corresponding to the region setting 428 (e.g., Japan) and/or the language setting 430 (e.g., Japanese). In some embodiments, the audio settings 434 are configured by the first user 202, for example, according to the first user 202's personal preferences of greetings.

Using the specific example of the conversation assistance settings illustrated in FIG. 4B, if the first user 202 would like to save the conversation assistance settings including region setting 428, language setting 430, interaction gesture settings 426a-d and audio settings 434a-b (e.g., on the first user device 204, on the system provider device 502, or any other device), the first user 202 may select the "SAVE" choice 440 in the conversation assistance settings screen 404.

In some embodiments, conversation assistance settings may include hand gesture settings. Referring now to the example of FIG. 4C, the first user device 204 includes a display 402 displaying a conversation assistance settings screen 404 that includes a hand gesture settings section 442 including hand gesture settings 444a, 444b, and 444c. Each hand gesture setting 444a-c may include a hand gesture type 446 and information type 450. For example, the hand gesture setting 444a provides that an "ok" hand gesture indicates the first user 202 needs information about the children of the first person 206. In another example, the hand gesture setting 444b provides that a hand gesture of extending one finger indicates that the first user 202 needs information about the name of the first person 206. In another example, the hand gesture setting 444c provides that a hand gesture of extending two fingers indicates the first user 202 needs information about the employer and job title of the first person 206. As discussed below, the hand gesture settings may be provided by the first user 202 to activate the conversation assistance system discreetly such that conversation assistance may be provided to the first user 202 without knowledge of the first person 206.

In some embodiments, the first user device 204 may determine that a particular gesture may be offensive (e.g., a thumb-down hand gesture) according to the region setting 428 (e.g., Japan) and/or language setting 430 (e.g., Japanese), and exclude the particular gesture from hand gestures that the first user 202 may be able to choose in the hand gesture settings section 442.

Figure 4C:
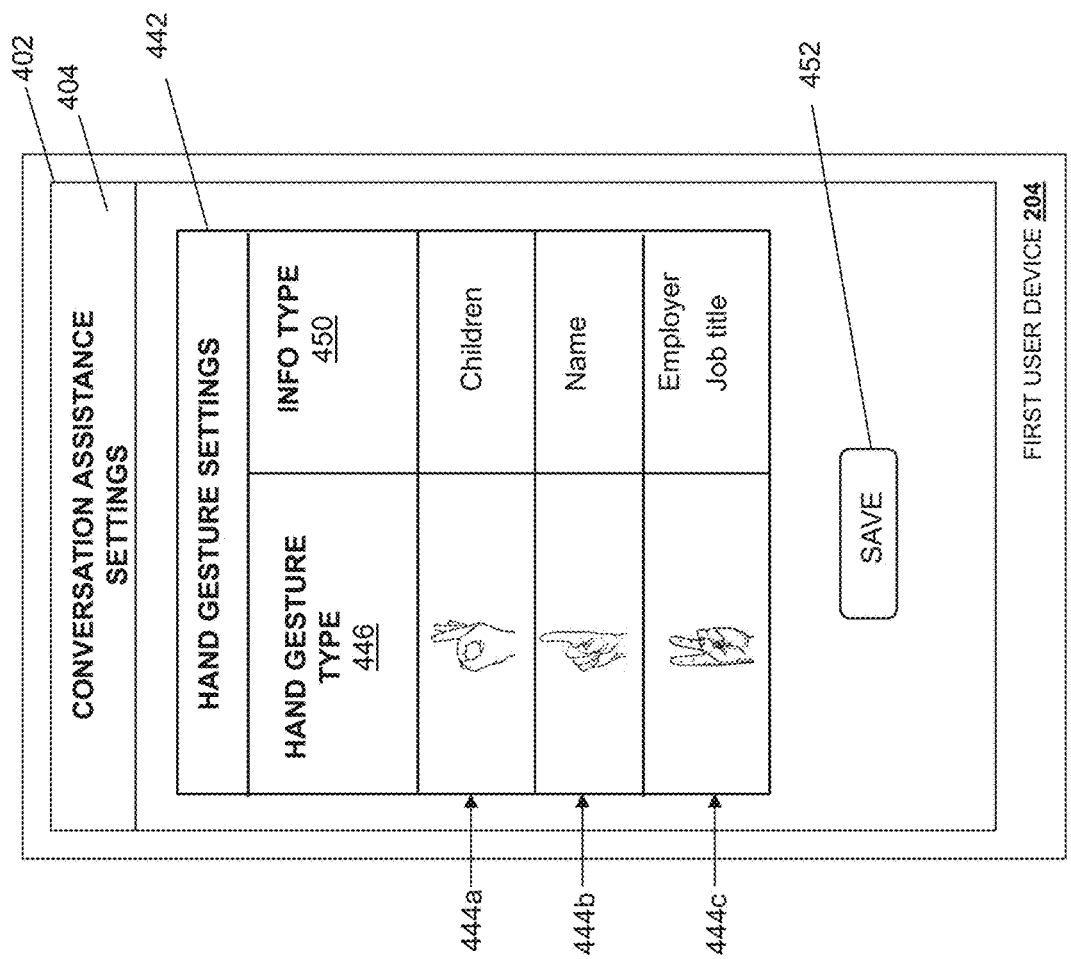
FIG. 4C is a screen shot illustrating an embodiment of a user device displaying a conversation assistance settings screen.

Using the specific example of the conversation assistance settings illustrated in FIG. 4C, if the first user 202 would like to save the conversation assistance settings including the hand gesture settings 444a-c (e.g., on the first user device 204, on the system provider device 502, or any other device), the first user 202 may select the "SAVE" choice 452 in the conversation assistance settings screen 404.

In some embodiments, conversation assistance settings may include conversation history settings. As illustrated in FIG. 4D, the first user device 204 includes a display 402 displaying a conversation assistance settings screen 404 that includes a conversation history settings section 454 including conversation history settings 456a, 456b, and 456c. Each conversation history setting 456a-c may include a last conversation time 458, a last conversation setting 460, and an information type 462 needed by the first user 202. In the example of FIG. 4D, the conversation history setting 456a provides that if the last conversation between the first user 202 and the first person 206 happened within the last month, then the first user 202 needs conversation assistance information of information types for the wife and children, but not the name of the first person 206. In another example, the conversation history setting 456b provides that if the last conversation between the first user 202 and the first person 206 happened over one month ago in a social setting (e.g., a birthday party), the corresponding information types are associated with for the name, wife, and children of the first person 206. In another example, the conversation history setting 456c provides that if the last conversation happened over one month ago in a business setting (e.g., a business conference), the corresponding information types are for the name, employer, and job title of the first person 206.

Referring back to FIG. 1, at block 104, in some embodiments, during conversation 200 or when conversation 200 is about to happen, the first user device 204 may retrieve the conversation assistance settings (e.g., from the first user device 204, the system provider device, or any other device), and determine the need for conversation assistance and conversation assistance information types needed by the first user 202 according to conversation assistance settings.

In some embodiments, the first user device 204 determines the need for conversation assistance according to the body measurement data of the conversation information and body measurement settings. In one example, the body measurement data of the conversation information may include heart rate data (e.g., with a heart rate of 86 beats each minute), body temperature data (e.g., with a temperature of 37.1° C.), and perspiration rate data (e.g., with a perspiration rate of 0.6 milligram per square centimeter per minute). The first user device 204 may analyze the body measurement data of the conversation information using the criterion of enabled body measurement settings 408 (e.g., body measurement settings 408a and 408c of FIG. 4A), and determine that the first user 202 needs conversation assistance because the body measurement data meet the criterion of enabled body measurement setting 408a (e.g., greater than 85 beats per minute) and/or the criterion of enabled body measurement setting 408c (e.g., greater than 0.5 milligram per square centimeter per minute). In the particular example illustrated in FIG. 4A, the body temperature data would not be used because body measurement setting 408b associated with body temperature is not enabled.

In some embodiments, the first user device 204 determines the need for conversation assistance according to the interaction gesture information of the conversation information and interaction gesture settings 426. The interaction gesture information of the conversation information corresponds to an interaction gesture of the first user 202. In one example, the corresponding interaction gesture is a handshake, and the first user device 204 may determine that the first user 202 needs conversation assistance in conversation 200 according to the indicator status of "Yes" in the interaction gesture setting 426a associated with a handshake. In another example, the corresponding interaction gesture is a hug, and the first user device 204 may determine that the first user 202 does not need conversation assistance in conversation 200 according to the indicator status of "No" in the interaction gesture setting 426b associated with a hug.

In some embodiments, the first user device 204 determines the need for conversation assistance according to the audio information of the conversation information and audio settings 434. The audio information of the conversation information may correspond to one or more statements of the first user 202. In one example, the corresponding statement is "Hey you . . . ." The first user device 204 may determine that the first user 202 needs conversation assistance in conversation 200 according to audio setting 434a associated with the statement "Hey you . . . .". In another example, the corresponding statement is "Hi James" provided by the first user 202 or "Hi, my name is James" provided by the first person 206, and the first user device 204 may determine that the first user 202 does not need conversation assistance for the name of the first person 206 in conversation 200 because it determines that the first person 206's name (e.g., James) has already been spoken (e.g., by the first user 202 or the first person 206).

In some embodiments, the first user device 204 may also determine the information types needed by the first user 202 in conversation 200 according to the audio information of the conversation information and audio settings 434. In one example, the statement corresponding to the audio information is "How is life?" The first user device 204 may determine that the first user 202 needs conversation assistance information of information types associated with the wife and children of the first person 206 according to information types 438 of audio setting 434b.

In some embodiments, the first user device 204 may determine the need for conversation assistance according to the hand gesture information of the conversation information and hand gesture settings 444. The hand gesture information of the conversation information may correspond to a hand gesture of the first user 202. In one example, the corresponding hand gesture is an "ok" hand gesture. The first user device 204 may determine that the first user 202 needs conversation assistance in conversation 200 according to the hand gesture setting 444a associated with the "ok" hand gesture.

In some embodiments, the first user device 204 may also determine the information types needed by the first user 202 in conversation 200 according to the hand gesture information of the conversation information and hand gesture settings 444. In one example, the corresponding hand gesture is a hand gesture of extending two fingers. The first user device 204 may determine that the first user 202 needs conversation assistance information of information types for the employer and job title of the first person 206 according to information types 450 of hand gesture setting 444c associated with the hand gesture of extending two fingers.

In some embodiments, the first user device 204 may also determine the information types needed by the first user 202 in conversation 200 according to the conversation history information and conversation history settings 456. The conversation history information may be collected (e.g., by the first user device 204, system provider device, or any other device) from previous conversation(s) between the first user 202 and the first person 206 stored in a database (e.g., a conversation assistance information database). In one example, the conversation history information indicates that the last conversation between the first user 202 and first person 206 happened over a month ago in a business setting. The first user device 204 may determine that the first user 202 needs conversation assistance information of information types for the name, employer, and job title of the first user 202 according to the information type 462 of conversation history setting 456c associated with the last conversation time and setting of the last conversation.

While the analysis of the determination of the need for conversation assistance and information types has been discussed as being performed in the first user device 204, in some embodiments, the conversation information may be sent to the system provider device and then analyzed by the system provider device to determine a need for conversation assistance and information types, while remaining within the scope of the present disclosure. Furthermore, while a variety of specific information uses has been described to determine whether to provide conversation assistance and what type of conversation assistance to provide, different combinations of conversation information, as well as other information not discussed explicitly above, may be utilized in the method 100 while remaining within the scope of the present disclosure.

Figure 5A:
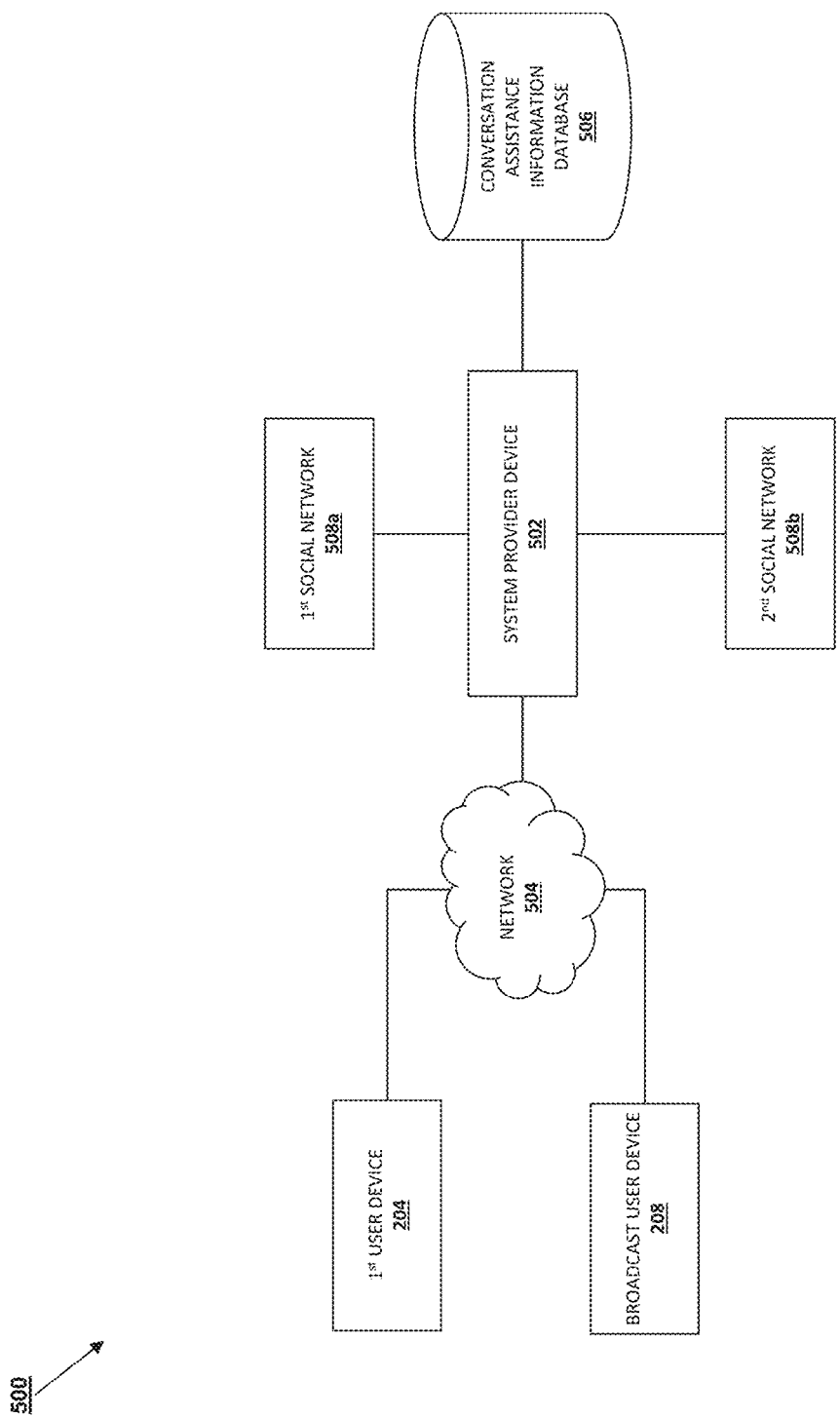
FIG. 5A is a schematic view illustrating an embodiment of a conversation assistance system.

Referring now to FIGS. 1 and 5A-5C, the method 100 now proceeds to block 106, where conversation assistance information associated with the first person is retrieved. Conversation assistance information of various information types may be retrieved from various information sources. Referring now to FIG. 5A, an embodiment of a conversation assistance system 500 with various information sources is illustrated. The conversation assistance system 500 includes a system provider device 502 communicatively coupled through a network 504 to the first user device 204 and the broadcast user device 208. The system provider device 502 is further communicatively coupled to a conversation assistance information database 506. While illustrated as a single database that is directly connected to the system provider device 502, the conversation assistance information database 506 may be provided in multiple databases, and/or may be coupled to the system provider device 502 by the network 504. The system provider device 502 is further communicatively coupled to a first social network 508a and a second social network 508b. In some embodiments, the system provider device 502 may receive conversation information from the first user device 204 and may further analyze conversation information received from the first user device 204 (e.g., the audio information, body measurement data, gesture information, etc.). In some embodiments, the system provider device 502 may determine that the first user 202 needs conversation assistance in conversation 200 and conversation assistance information types needed by the first user 202.

In some embodiments, the system provider device 502 may select information sources (e.g., the social networks 508a and 508b, the broadcast user device 208, the conversation assistance information database 506, other information sources, and/or combinations thereof) for retrieving conversation assistance information according to the information types needed by the first user 202 and the specific information types provided by respective information sources. In some embodiments, different information sources may provide conversation assistance information that includes different information types. In some embodiments, instead of retrieving conversation assistance information of all information types from all information sources, the system provider device 502 only retrieves conversation assistance information from selected sources, which may improve the performance (e.g., in computation bandwidth, speed, power consumption) of the conversation assistance system 500.

Figure 5B:
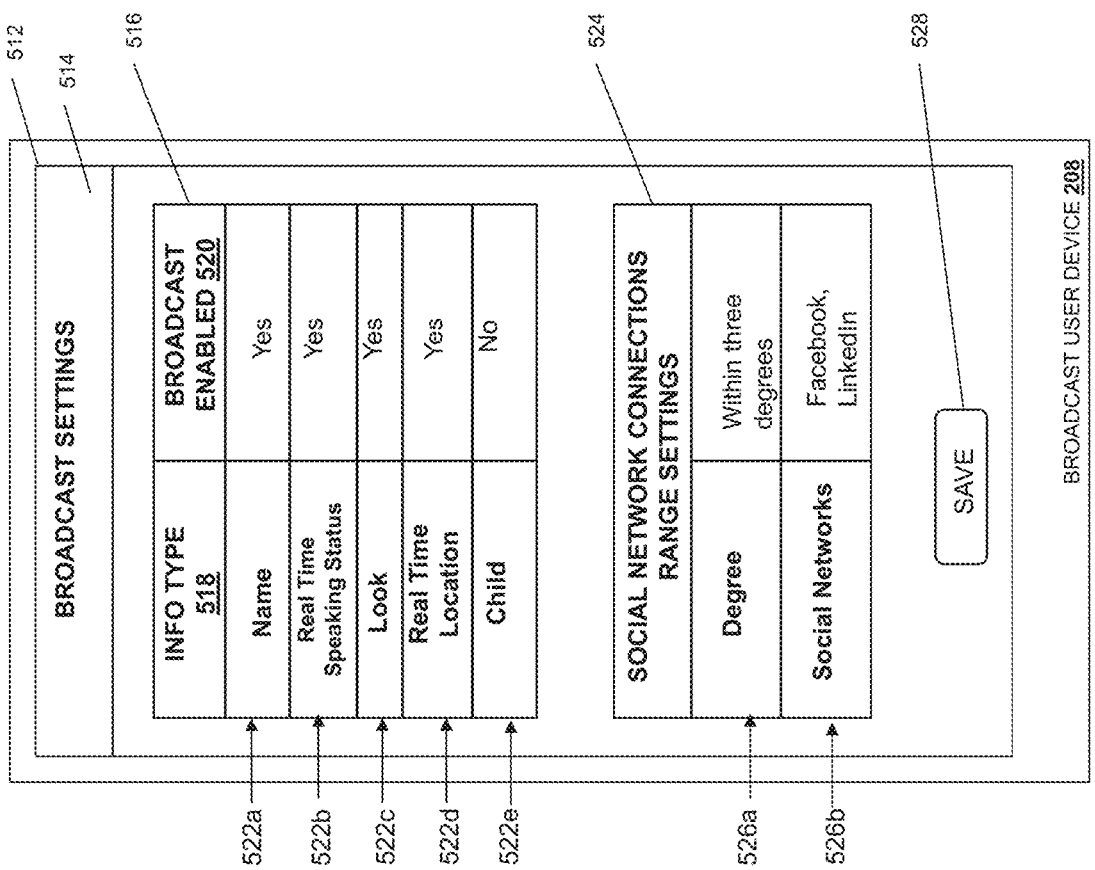
FIG. 5B is a screen shot illustrating an embodiment of a broadcast user device displaying a broadcast settings screen.

In some embodiments, the broadcast user device 208 may provide conversation assistance information of specific information types (e.g., for a name, a real time speaking status, a look (discussed further below), and/or a real time location), which may be determined according to broadcast settings. Referring now to FIG. 5B, in some embodiments, the first person 206 involved in the conversation 200 may configure broadcast user device 208 to broadcast conversation assistance information of specific information types associated with the first person 206 according to broadcast settings including information type settings. As illustrated in FIG. 5B, broadcast user device 208 includes a display 512 displaying a broadcast settings screen 514 that includes an information type settings section 516 including information type settings 522a, 522b, 522c, 522d, and 522e. Each information type setting 522a-e includes an information type 518 and a broadcast enabled status 520. In the examples illustrated in FIG. 5B, the information type settings 522a, 522b, 522c, and 522d provide that broadcast is enabled for information types that include the name, the real time speaking status, the look, and the real time location of the first person 206. On the other hand, the information type setting 522e provides that broadcast is not enabled for information type for the child of the first person 206.

In some embodiments, the broadcast settings may include social network connections range settings, which may be used by the broadcast user device 208 to determine its broadcast range. As illustrated in FIG. 5B, broadcast settings screen 512 includes a social network connections range settings section 524 including social network connections range settings 526a and 526b. In the example illustrated in FIG. 5B, the social network connections range setting 526a provides for the broadcast of communication assistance information to users with a first, second, or third degree connection of the first person 206 via a social network. In another example, the social network connections range setting 526b provides for the broadcast of communication assistance information to users included in a social network provided by FACEBOOK® and a social network provided by LINKEDIN®. Using the specific example of the broadcast settings illustrated in FIG. 5B, if the first person 206 would like to save the broadcast settings (e.g., on the broadcast user device 208, on the system provider device 502, or any other device), the first person 206 may select the "SAVE" choice 528 in the broadcast settings screen 514.

In some embodiments, the conversation assistance information database 506 may include conversation assistance information of specific information types (e.g., for the name, last conversation time, last conversation location, event, job title, employer, wife, children, description, and/or conversation history), which may be determined according to configurations of the conversation assistance information database 506. Referring now to FIG. 5C, an embodiment of a conversation assistance information database 506 including a conversation assistance information table 530 is illustrated. The conversation assistance information table 530 is associated with the first user 202. In the illustrated example, the conversation assistance information table 530 may include columns that provide a name field 534, a time field 536, a location field 538, an event field 540, a job title field 542, an employer field 544, a wife field 546, a children field 548, and description field 550 for any of a plurality of rows in the conversation assistance information table 530 that identify a previous conversation 532 involving the first user 202. Each column may correspond to an information type. In the illustrated example, conversation assistance information corresponding to two previous conversations 532a and 532b involving the first user 202 and the first person 206 (e.g., Donald) is stored in the conversation assistance information table 530. As such, information captured during previous conversations by the user 202 may be stored in the conversation assistance information database 506 and provided during current and/or subsequent conversations as conversation assistance information to the user 202. Furthermore, information in the conversation assistance information database 506 may be provided to a user during a current conversation based on a variety of factors. For example, information (e.g., a name) associated with a conversation several weeks before between the user and a person may be provided to the user upon a new conversation with that person, while the same information associated with a conversation a few hours before between the user and a person may not be provided to the user upon a new conversation with that person.

In some embodiments, each of the social networks 508a and 508b may provide conversation assistance information of specific information types (e.g., for connections in the social network, employer, and/or job title), which may be determined according to configurations of the social networks. In one example, conversation assistance information of an information type for connections in a social network may be available from the first social network 508a. In another example, conversation assistance information of information types for the employer and job title may be available from the second social network 508b (e.g., LINKEDIN®).

In some embodiments, the system provider device 502 may retrieve conversation assistance information of the one or more information types needed by the first user 202 from selected information sources. In one example, the first user 202 may need conversation assistance information of information types that include the name, employer, and children of a person. In a specific example, the system provider device 502 may then retrieve the name information from broadcast user device 208, the employer information from the second social network 208b, and the children information from the conversation assistance information database 506.

Figure 6:
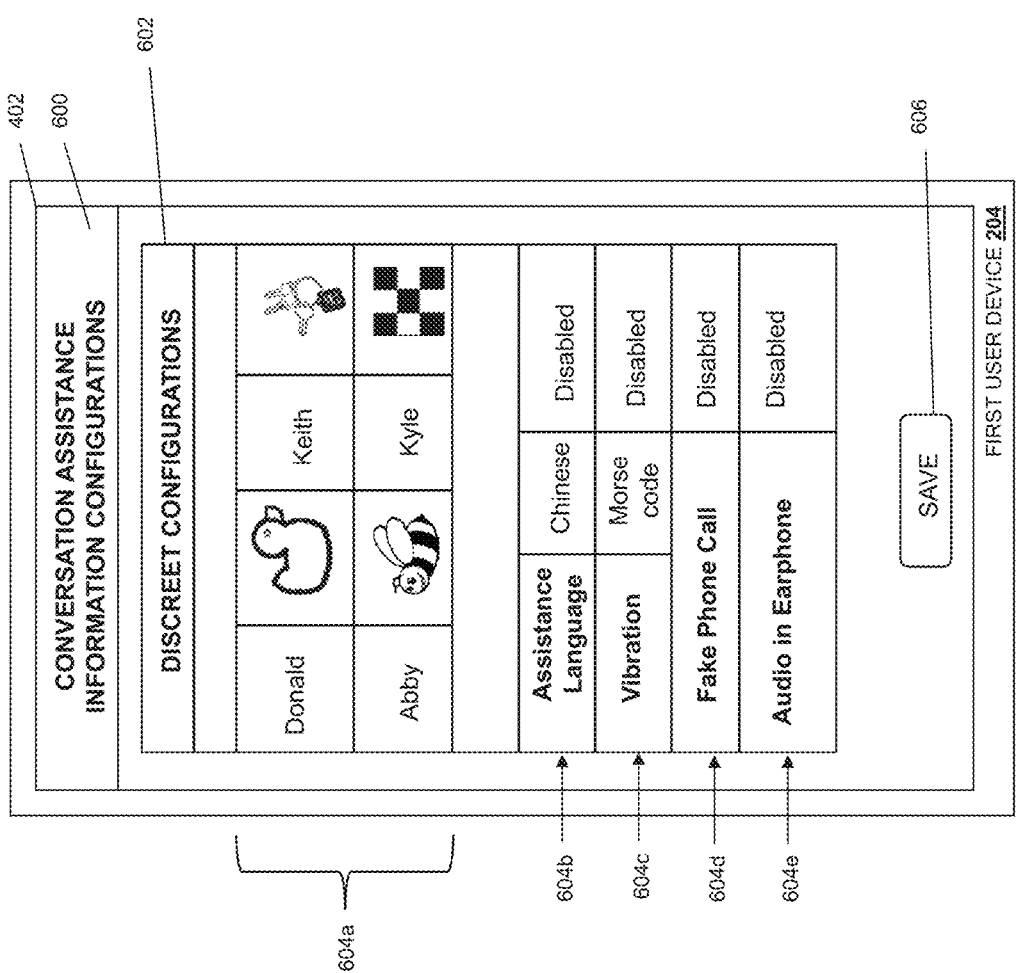
FIG. 6 is a screen shot illustrating an embodiment of a user device displaying a conversation assistance information configurations screen.

Referring now to FIGS. 1 and 6, the method 100 now proceeds to block 108, where a conversation assistance information configuration is retrieved (e.g., from the first user device 204, the system provider device 502, or any other device).

In some embodiments, the conversation assistance information configuration may include discreet configurations to provide for discreet provision of conversation assistance information to the first user 202 (e.g., through the at least one first user device 204) in an ongoing conversation 200 so that, for example, other persons involved in conversation 200 (e.g., the first person 206) do not notice that the first user 202 is asking for and/or receiving conversation assistance. Referring now to FIG. 6, embodiments of various discreet configurations are illustrated. As illustrated in the example of FIG. 6, the first user device 204 includes a display 402 displaying a conversation assistance information configurations screen 600 including a discreet configurations section 602. The discreet configurations section 602 includes various discreet configurations 604a, 604b, 604c, 604d, and 604e. For example, as illustrated in FIG. 6, the discreet configuration 604a provides images for corresponding names (e.g., images of a duck for the name "Donald," keys for the name "Keith," a bee for the name "Abby," and tiles for the name "Kyle"). In another example, the discreet configuration 604b may provide for displaying the conversation assistance information (e.g., the name of the first person 206) in an assistance language (e.g., Chinese) that may be different than the language being spoken in the conversation 200. In another example, the discreet configuration 604c may provide for vibrating the first user device 204 in code (e.g., Morse code) for the conversation assistance information (e.g., the name of the first person 206). In another example, the discreet configuration 604d may provide for making a fake phone call to the first user 202 and displaying the conversation assistance information (e.g., the name of the first person 206) as the caller identifier displayed on the at least one first user device 204. In another example, the discreet configuration 604e may provide for using audio in an earphone of the at least one first user device 204 to provide the conversation assistance information. In some embodiments, specific discreet configurations may be enabled or disabled automatically according to the availability of required devices (e.g., an earphone) or functions (e.g., vibration), or according to the first user 202's personal preferences provided by the first user 202.

Using the specific example of the conversation assistance information configurations illustrated in FIG. 6, if the first user 202 would like to save conversation assistance information configurations including discreet configurations 604a-604e (e.g., on the first user device 204, on the system provider device 502, or any other device), the first user 202 may select the "SAVE" choice 606 in the conversation assistance information configurations screen 600.

In some embodiments, the conversation assistance information configuration may include a non-discreet configuration, which may be used to provide conversation assistance information associated with potential conversation participants.

Figure 7:
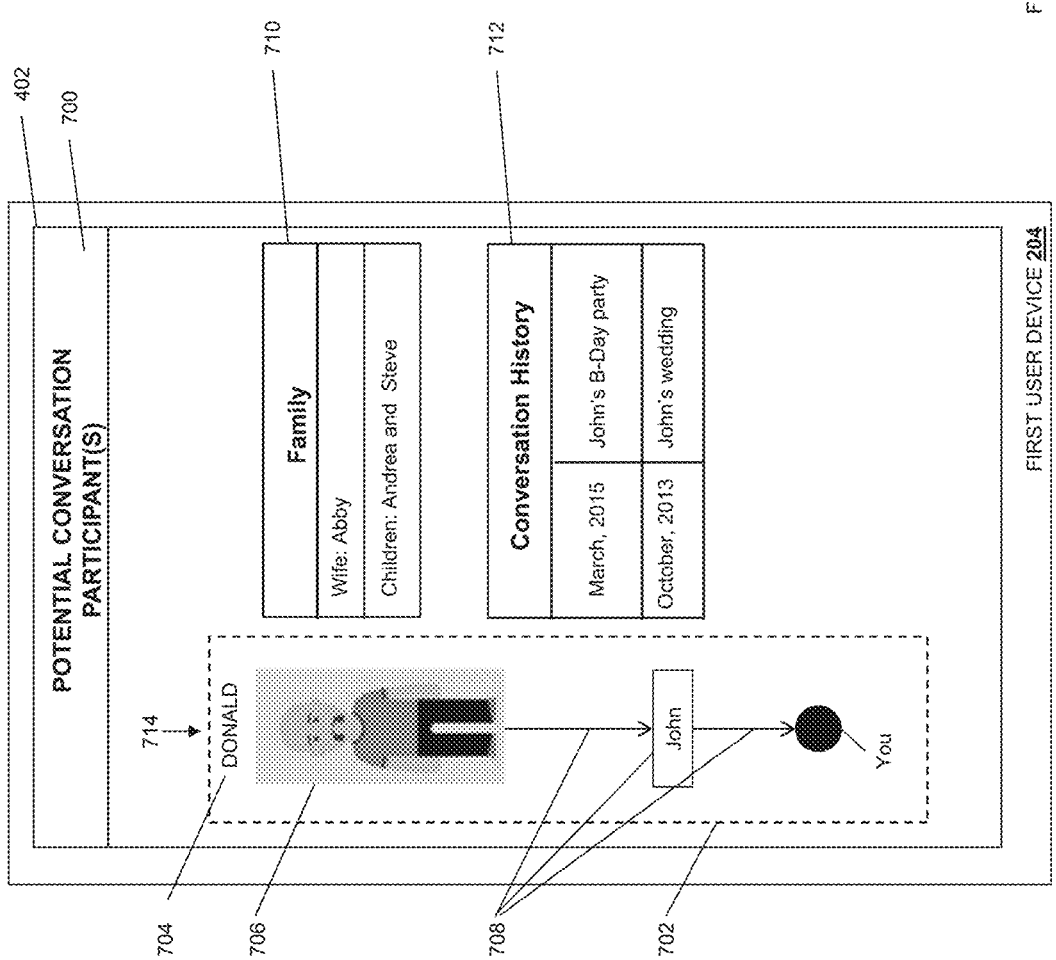
FIG. 7 is a screen shot illustrating an embodiment of a user device displaying conversation assistance information associated with a single person.
Figure 8:
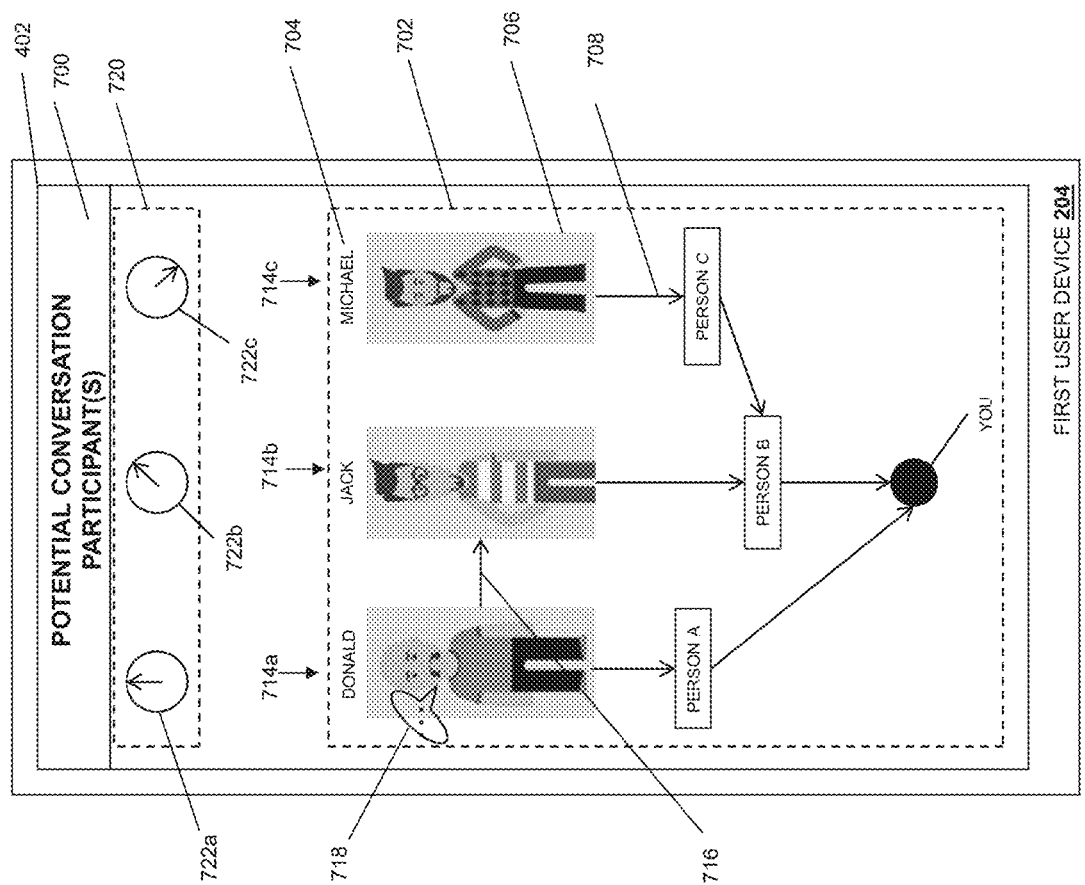
FIG. 8 is a screen shot illustrating an embodiment of a user device displaying conversation assistance information associated with multiple persons.

Referring now to FIGS. 1, 7, and 8, after a conversation assistance information configuration has been retrieved, the method 100 may proceed to block 110, where the conversation assistance information including information types needed by the first user 202 is provided to the first user 202 through the at least one user device 204 according to the conversation assistance information configuration.

In some embodiments, the conversation assistance information configuration includes the discreet configurations 604 for providing conversation assistance information during conversation 200 discreetly, and the system provider device 502 may adapt the conversation assistance information according to the enabled discreet configurations 602 (e.g., discreet configuration 604a of FIG. 6). In one example, the conversation assistance information includes a name "Donald." If discreet configuration 604a is enabled, an image (e.g., a duck) for the name adapted using discreet configuration 604a is displayed on the first user device 204.

In another example, if discreet configuration 604b is enabled, a name in the assisted language (e.g., "唐纳德", or "Donald" in Chinese) adapted according to discreet configuration 604b is displayed on the first user device 204. In another example, if discreet configuration 604c is enabled, the first user device 204 vibrates according to the Morse code for "Donald" according to discreet configuration 604c. In another example, if discreet configuration 604d is enabled, the first user device 204 receives a fake phone call displaying a caller identifier (e.g., "Donald," or "唐纳德" if discreet configuration 604b is also enabled). In another example, if discreet configuration 604e is enabled, the first user 202 receives audio of "Donald" in an earphone of the first user device 204.

Referring to FIGS. 7 and 8, in some embodiments, the conversation assistance information is provided to the first user 202 through the first user device 204 according to non-discreet configurations. In one example, when the first user 202 arrives at a specific event, the first user 202 may be provided with conversation assistance information associated with potential conversation participants (e.g., according to persons connected to the first user 202 in social networks at the specific event, and/or location data from broadcast user devices at the specific event). Unlike providing conversation assistance information during an ongoing conversation, conversation assistance information associated with potential conversation participants may be provided according to non-discreet configurations, and more information types may be retrieved and/or provided to the first user 202.

Referring now to FIG. 7, an embodiment of conversation assistance information associated with one potential conversation participant is provided to the first user device 204. As illustrated in the example of FIG. 7, the first user device 204 includes a display 402 displaying a potential conversation participant(s) screen 700 including a participants section 702. In the example illustrated in FIG. 7, only one potential conversation participant 714 has been discovered (e.g., based on persons connected to the first user 202 in social networks at the specific event) and displayed in the participants section 702, and the conversation assistance information may be displayed according to a non-discreet configuration for a single potential conversation participant. The participants section 702 displays conversation assistance information of various types, including name 704 (e.g., "DONALD"), look 706 (e.g., an image of Donald), and connections 708 between the first user 202 and the potential conversation participant 714 (e.g., retrieved from first social network 508a).

In some embodiments, the potential conversation participant(s) screen 700 includes a family section 710 including conversation assistance information of information types (e.g., wife, children) related to the family. In some embodiments, the potential conversation participant(s) screen 700 includes a conversation history section 712 including information about previous conversations (e.g., retrieved from conversation assistance information database 506) involving the first user 202 and the potential conversation participant 714.

Referring now to FIG. 8, conversation assistance information associated with multiple potential conversation participants 714a, 714b, and 714c is provided to the first user device 204. As illustrated in the example of FIG. 8, the first user device 204 includes a display 402 displaying a potential conversation participant(s) screen 700 including a participants section 702. In the example illustrated in FIG. 7, at the specific event, the three potential conversation participants 714a, 714b, and 714c are discovered (e.g., based on location data provided by broadcast user devices used by the potential conversation participants), and conversation assistance information associated with the three potential conversation participants 714*a*, 714*b*, and 714*c* are displayed in the participants section 702. The conversation assistance information may be displayed according to a non-discreet configuration for multiple potential conversation participants. In addition to the information types (e.g., name 704, look 706, connections 708) displayed for a single potential conversation participant in FIG. 7, the participants section 702 includes connection 716 indicating connections between the potential conversation participants 714*a* and 714*b*.

In some embodiments, the participants section 702 includes speaking status 718 indicating the real time speaking status (e.g., retrieved from a broadcast user device carried by the potential conversation participant 714*a*) of the potential conversation participant 714*a*. In some embodiments, the participants section 702 includes a location section 720 including relative location indicators 722*a*, 722*b*, and 722*c* for respective potential conversation participants. In one example, the relative location indicator 722*a* indicates that potential conversation participant 714*a* is immediately in front of the first user 202. While the speaking status 718 and location indicators 722 are provided in an example of the identification of potential conversation participants, such features may be provided as conversation assistance information to the user 202 during a conversation with multiple people. For example, the user 202 may be in a conversation with multiple people, and the techniques described above may be utilized to identify each of those people similarly as illustrated in FIG. 8, while also providing the relative location of each person (via the location indicators 722*a*-*c*) and the speaking status 718. As such, a user may quickly and easily determine information about a plurality of people in a conversation, and may quickly distinguish information associated with those different people based on which one is currently speaking.

Referring now to FIGS. 1 and 9, the method 100 may proceed to block 112 where after the conversation 200 ends, a device (e.g., the first user device 204, the service provider device 502, and/or any other device) receives a conversation record of the conversation 200. In some embodiments, the user device may automatically update conversation assistance information database (e.g., using a speech recognition engine to analyze audio of the conversation record). In some embodiments, the first user 202 may review the conversation record (e.g., listening to the audio of the conversation record) and update the conversation assistance information database. Referring now to FIG. 9, illustrated is a conversation assistance information database 506 including a conversation assistance information table 530 updated with the conversation record of the conversation 200. As illustrated in FIG. 9, a time 536, location 538, event 540, employer 544, children 548, and description 550 corresponding to the conversation 200 have been updated to include information collected in conversation 200. In some embodiments, the information in the conversation assistance information table 530 may be provided for display to a user subsequent to a conversation to allow that user to review the details of a conversation that may be important to remember.

Thus, conversation assistance systems and methods have been described that operate to assist a user engaging in a conversation by providing that user with relevant information for use in that conversation. The systems and methods may use a variety of data to detect that a conversation is occurring, and then automatically retrieve and provide conversation assistance information to the user in a variety of ways to allow that user to use that conversation assistance in the conversation. For example, the system may discreetly detect that a conversation has begun via conversation initiate actions such as handshakes, and may also determine that body measurement data (e.g., an increased heart rate, increased perspiration, etc.) indicates that the user may not know a name of the person with whom the user is starting the conversation. The systems may then retrieve the name of that person and provide it discreetly to the user so that they may use it during the conversation. Such systems and methods improve the ability of users to participate in conversations with people whom they may have forgotten relevant and/or important information about, thus enhancing the users' interactions with others.

Figure 10:
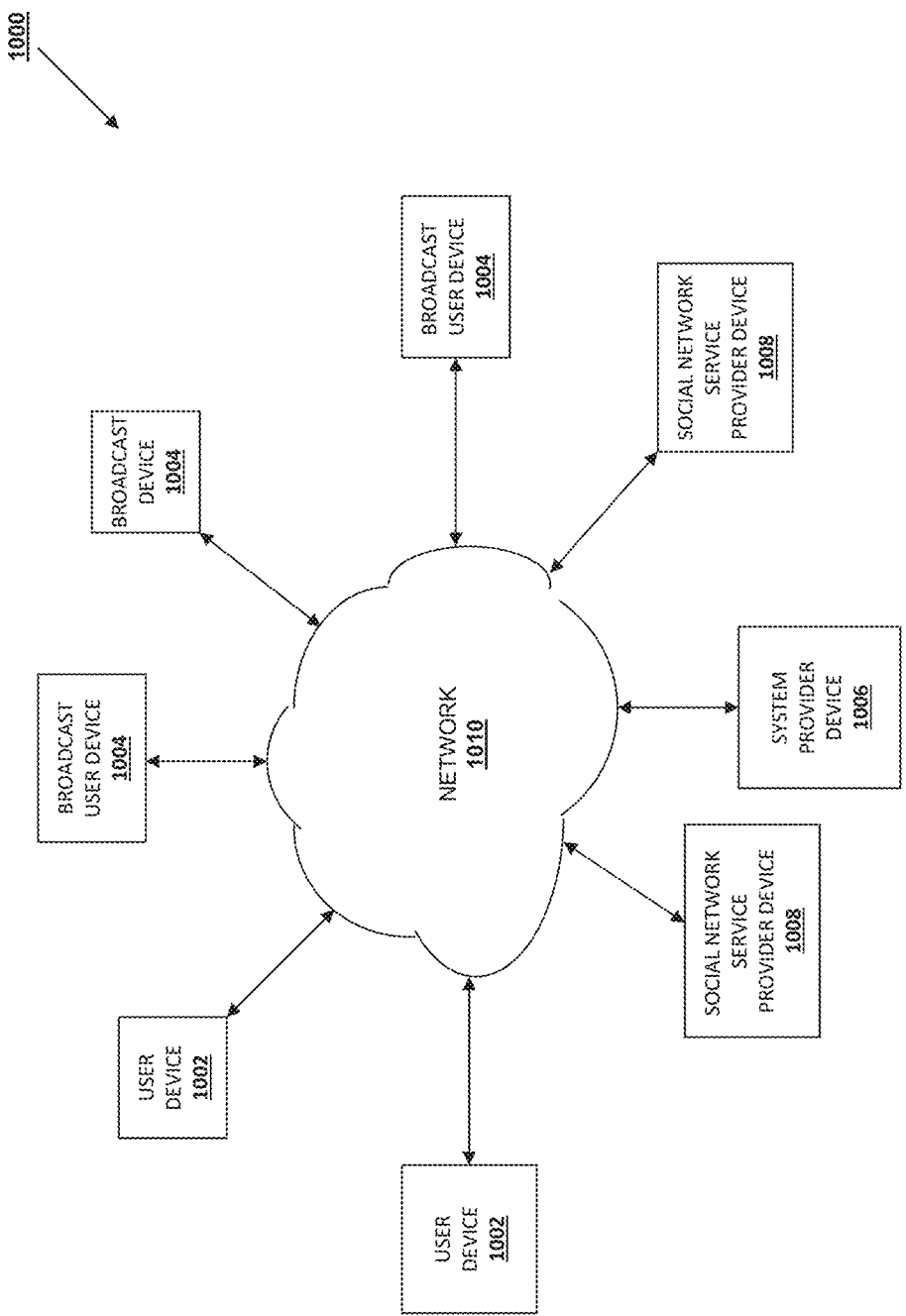
FIG. 10 is a schematic view illustrating an embodiment of a networked system.

Referring now to FIG. 10, an embodiment of a network-based system 1000 for implementing one or more processes described herein is illustrated. As shown, network-based system 1000 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 6 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1000 illustrated in FIG. 10 includes a plurality of user devices 1002, a plurality of broadcast user devices 1004, a system provider device 1006, and a plurality of social network service provider devices 1008 in communication over a network 1010. Any of the user devices 1002 may be the user devices 204 discussed above. The broadcast user devices 1004 may be the broadcast user devices 208 discussed above and may be used by the first person 206 discussed above. The system provider device 1006 may be the system provider device 502 discussed above and may be operated by a system provider such as, for example, PayPal Inc. of San Jose, Calif.

The user devices 1002, broadcast user devices 1004, and system provider device 1006 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1000, and/or accessible over the network 1010.

The network 1010 may be implemented as a single network or a combination of multiple networks. For example, in various embodiments, the network 1010 may include the Internet and/or one or more intranets, landline networks, wireless networks, and/or other appropriate types of networks.

The user device 1002 may be implemented using any appropriate combination of hardware and/or software configured for wired and/or wireless communication over network 1010. For example, in one embodiment, the user device 1002 may be implemented as a personal computer of a user in communication with the Internet. In some embodiments, the user device 1002 may be a wearable device. In some embodiments, the user device 1002 may be a smart phone, personal digital assistant (PDA), laptop computer, and/or other types of computing devices.

The user device 1002 may include one or more browser applications which may be used, for example, to provide a convenient interface to permit the first user 202 to browse information available over the network 1010. For example, in one embodiment, the browser application may be implemented as a web browser configured to view information available over the Internet.

The user device 1002 may also include one or more toolbar applications which may be used, for example, to provide user-side processing for performing desired tasks in response to operations selected by the first user. In one embodiment, the toolbar application may display a user interface in connection with the browser application.

The user device 1002 may further include other applications as may be desired in particular embodiments to provide desired features to the user device 1002. In particular, the other applications may include a social network application provided by a social network service provider through the social network service provider device 1008. The other applications may also include security applications for implementing user-side security features, programmatic user applications for interfacing with appropriate application programming interfaces (APIs) over the network 1010, or other types of applications. Email and/or text applications may also be included, which allow the user to send and receive emails and/or text messages through the network 110. The user device 1002 includes one or more user and/or device identifiers which may be implemented, for example, as operating system registry entries, cookies associated with the browser application, identifiers associated with hardware of the user device 1002, or other appropriate identifiers, such as a phone number. In one embodiment, the user identifier may be used by the system provider device 1006 and/or social network service provider device 1008 to associate the user with a particular account as further described herein.

Figure 11:
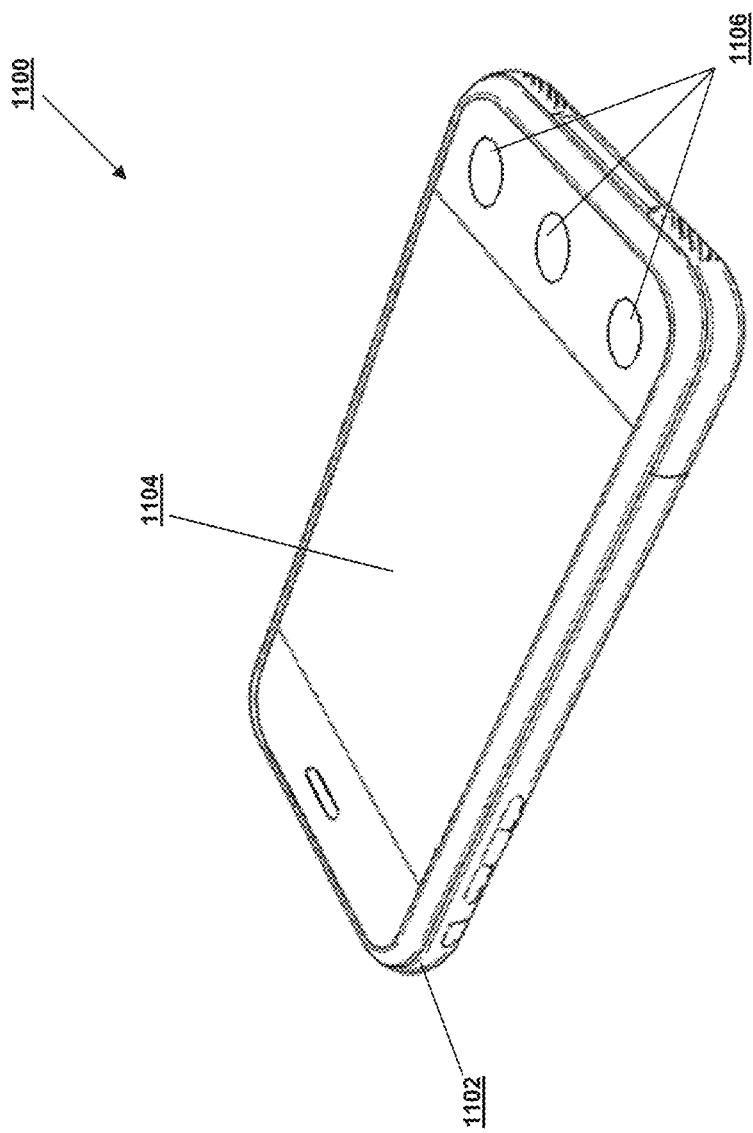
FIG. 11 is a perspective view illustrating an embodiment of a user device.

Referring now to FIG. 11, an embodiment of a user device 1100 is illustrated. The user device 1100 may be the user devices 204 or broadcast user device 208. The user device 1100 includes a chassis 1102 having a display 1104 and an input device including the display 1104 and a plurality of input buttons 1106. One of skill in the art will recognize that the user device 1100 is a portable or mobile phone including a touch screen input device and a plurality of input buttons that allow the functionality discussed above with reference to the method 100. However, a variety of other portable/mobile user devices may be used in the method 100 without departing from the scope of the present disclosure.

Figure 12:
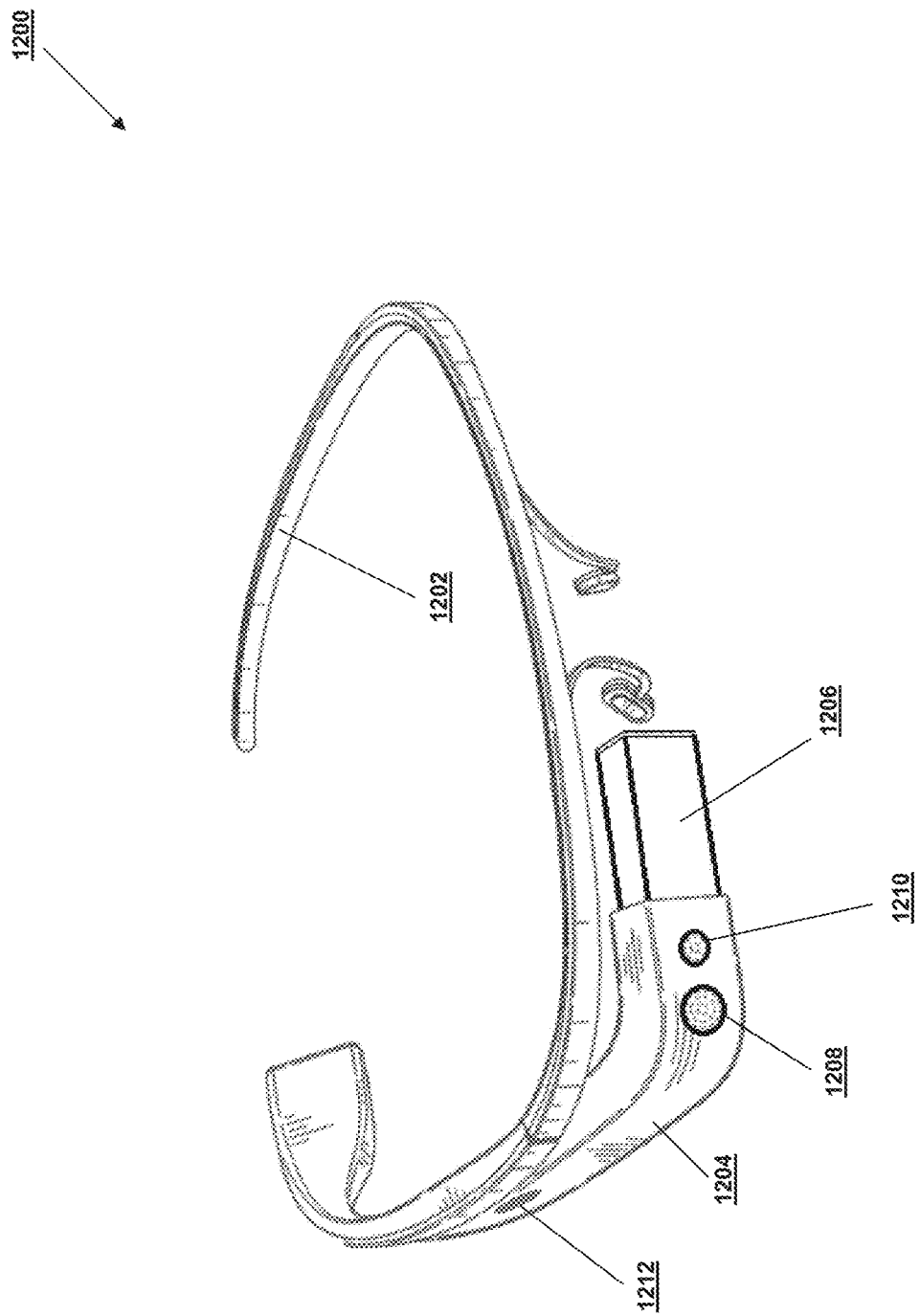
FIG. 12 is a perspective view illustrating an embodiment of a wearable device.

Referring now to FIG. 12, an embodiment of a wearable user device 1200 is illustrated. The wearable user device 1200 may be the may be the wearable user devices 204 or broadcast user device 208 discussed above. The wearable user device 1200 includes a frame 1202 having a computing chassis 1204 that extends from the frame 1202, a display device 1206 that extends from the computing chassis 1204, a microphone 1208 located on the computing chassis 1204, a camera 1210 located on the computing chassis 1204, and a speaker 1212 located on the computing chassis 1204. One of skill in the art will recognize that the wearable user device 1200 is a mobile wearable device such as, for example, Google Glass® available from Google Inc. of Mountain View, Calif. that may provide a user with the functionality discussed above with reference to the methods discussed above. However, a variety of other mobile wearable devices may be used in the methods discussed above without departing from the scope of the present disclosure.

Figure 13:
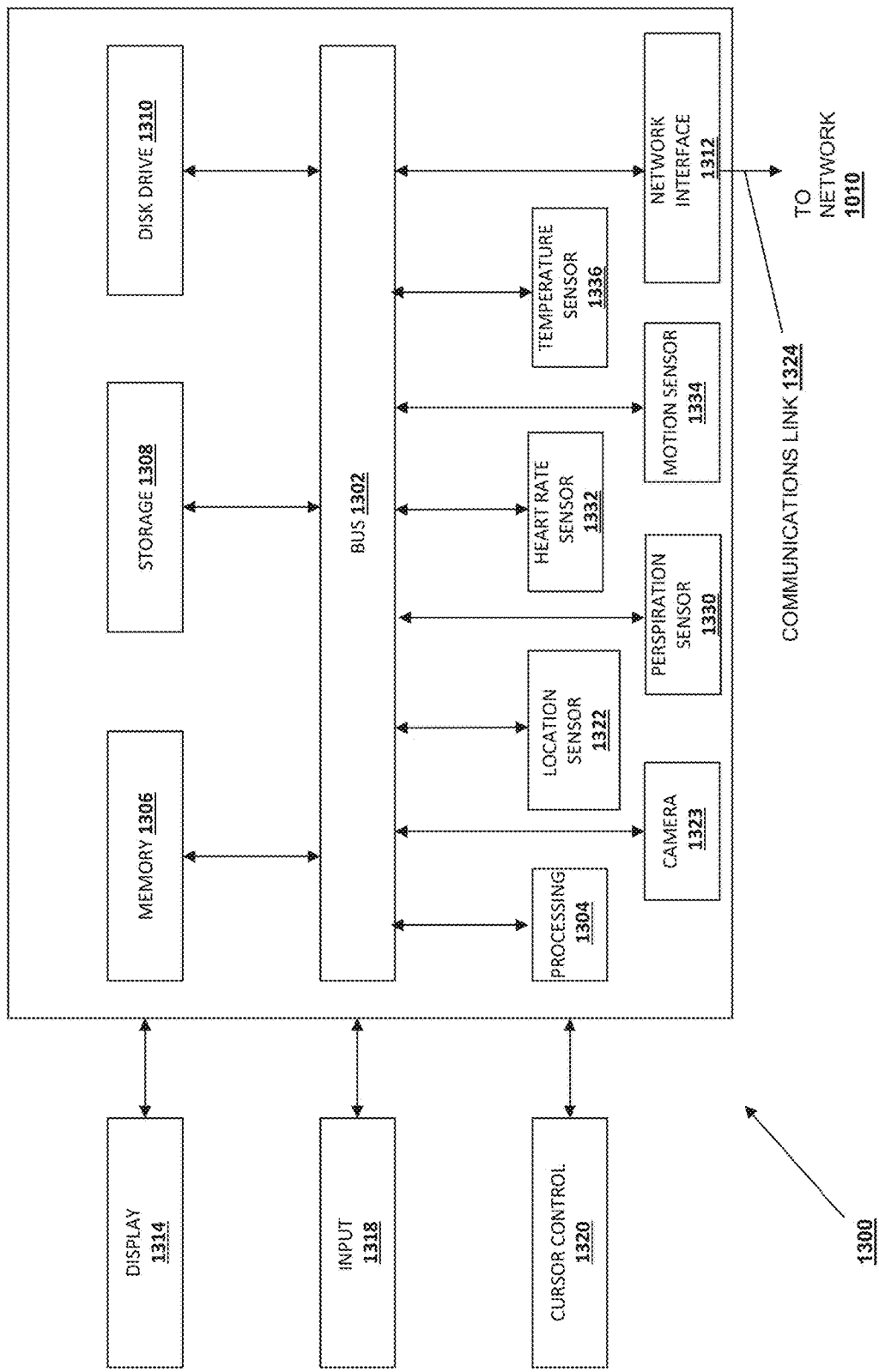
FIG. 13 is a schematic view illustrating an embodiment of a computer system.

Referring now to FIG. 13, an embodiment of a computer system 1300 suitable for implementing, for example, the user devices 204, broadcast user device 208, and/or system provider device 502, is illustrated. It should be appreciated that other devices utilized by users, persons, and/or system providers in the system discussed above may be implemented as the computer system 1300 in a manner as follows.

In accordance with various embodiments of the present disclosure, computer system 1300, such as a computer and/or a network server, includes a bus 1302 or other communication mechanism for communicating information, which interconnects subsystems and components, such as a processing component 1304 (e.g., processor, micro-controller, digital signal processor (DSP), etc.), a system memory component 1306 (e.g., RAM), a static storage component 1308 (e.g., ROM), a disk drive component 1310 (e.g., magnetic or optical), a network interface component 1312 (e.g., modem or Ethernet card), a display component 1314 (e.g., CRT or LCD), an input component 1318 (e.g., keyboard, keypad, or virtual keyboard), a cursor control component 1320 (e.g., mouse, pointer, or trackball), a location sensor component 1322 (e.g., a Global Positioning System (GPS) device as illustrated, a cell tower triangulation device, and/or a variety of other location determination devices known in the art.), a camera component 1323, a perspiration sensor component 1330, a heart rate sensor 1332, a motion sensor component 1334, and/or a temperature sensor 1336. In one implementation, the disk drive component 1310 may comprise a database having one or more disk drive components.

In accordance with embodiments of the present disclosure, the computer system 1300 performs specific operations by the processor 1304 executing one or more sequences of instructions contained in the memory component 1306, such as described herein with respect to the user device(s) 204, the broadcast user device(s) 208, and/or the system provider device(s) 502. Such instructions may be read into the system memory component 1306 from another computer readable medium, such as the static storage component 1308 or the disk drive component 1310. In other embodiments, hard-wired circuitry may be used in place of or in combination with software instructions to implement the present disclosure.

Logic may be encoded in a computer readable medium, which may refer to any medium that participates in providing instructions to the processor 1304 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1310, volatile media includes dynamic memory, such as the system memory component 1306, and transmission media includes coaxial cables, copper wire, and fiber optics, including wires that comprise the bus 1302. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1300. In various other embodiments of the present disclosure, a plurality of the computer systems 1300 coupled by a communication link 1324 to the network 1010 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1300 may transmit and receive messages, data, information and instructions, including one or more programs (i.e., application code) through the communication link 1324 and the network interface component 1312. The network interface component 1312 may include an antenna, either separate or integrated, to enable transmission and reception via the communication link 1324. Received program code may be executed by processor 1304 as received and/or stored in disk drive component 1310 or some other non-volatile storage component for execution.

Figure 14:
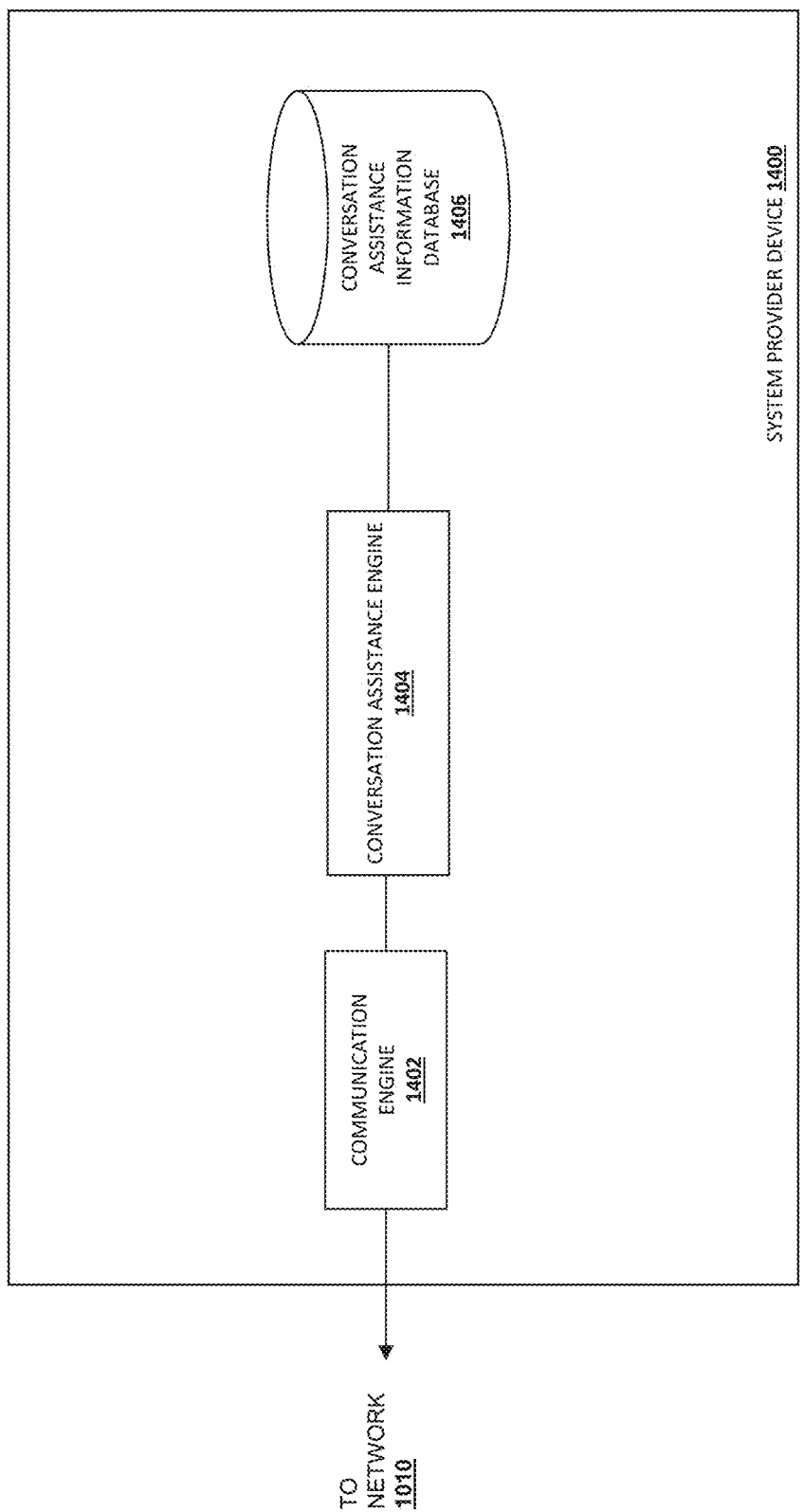
FIG. 14 is a schematic view illustrating an embodiment of a system provider device.

Referring now to FIG. 14, an embodiment of a system provider device 1400 is illustrated. In an embodiment, the system provider device 1400 may be the system provider devices 502 discussed above. The system provider device 1400 includes a communication engine 1402 that is coupled to the network 1010 and to a conversation assistance engine 1404 that is coupled to a conversation assistance information database 1406. The communication engine 1402 may be software or instructions stored on a computer-readable medium that allows the system provider device 1400 to send and receive information over the network 1010. The conversation assistance engine 1404 may be software or instructions stored on a computer-readable medium that is operable to receive conversation information including body measurement data, determine a need for conversation assistance using the body measurement data and information types needed by the first use 202, retrieve conversation assistance information, provide the conversation assistance information to the first user 202, and provide any of the other functionality that is discussed above. While the databases 1406 and 1408 have been illustrated as located in the system provider device 1400, one of skill in the art will recognize that it may be connected to the conversation assistance engine 1404 through the network 1010 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A conversation assistance system, comprising:
a non-transitory memory; and
one or more hardware processors coupled with the non-transitory memory and configured to read instructions from the non-transitory memory to cause the conversation assistance system to perform operations comprising:
responsive to receiving conversation information from a user device of a user, determining that the conversation information is associated with a conversation involving the user and a first person;
retrieving first conversation assistance information associated with the first person, wherein the first conversation assistance information comprises a name of the first person that is stored in a first format;
determining that the first conversation assistance information is associated with one or more discreet configurations;
dynamically altering the first conversation assistance information by replacing the name of the first person with data in a second format according to the one or more discreet configurations to obfuscate the first conversation assistance information; and
causing the user device to present the altered first conversation assistance information.

2. The system of claim 1, wherein the operations further comprise:
determining a communication medium from a plurality of communication mediums for presenting the altered first conversation assistance information based on one or more hardware components determined to be available on the user device; and
transmitting the altered first conversation assistance information to the user device according to the determined communication medium.

3. The system of claim 2, wherein the communication medium is further determined based on a first configuration, of a plurality of configurations, determined to be enabled on the user device, and wherein the first configuration corresponds to the communication medium.

4. The system of claim 1, wherein the name of the first person is stored in a first language, and wherein the one or more discreet configurations includes a configuration to alter the name of the first person to a corresponding word in a second language different from the first language.

5. The system of claim 4, wherein causing the user device to present the altered first conversation assistance information comprises transmitting a signal to the user device of the user to cause the corresponding word in the second language to be presented as a caller identification (ID) on a display of the user device of the user.

6. The system of claim 1, wherein the name of the person is stored as text, wherein the one or more discreet configurations includes a correlation between the name and an image, and wherein dynamically altering the first conversation assistance information comprises replacing the name of the first person in the first conversation assistance information with the image.

7. The system of claim 1, wherein the conversation information includes audio data associated with the first person, and wherein the operations further comprise analyzing the audio data to determine that the conversation information associated with the conversation involving the user and the first person.

8. A method for providing conversation assistance, comprising:
receiving, from at least one user device of a user, conversation information, wherein the conversation information includes body measurement data of the user, and wherein the conversation information is associated with a conversation involving the user and a first person;
accessing a database to retrieve first conversation assistance information associated with the first person;
determining that the body measurement data is within a predetermined range indicating the user is in need of conversation assistance in the conversation; and
in response to determining that the body measurement data is within the predetermined range, transmitting, to the at least one user device, the first conversation assistance information associated with the first person.

9. The method of claim 8, wherein the body measurement data of the user includes at least one of heart rate data, temperature data, or perspiration data.

10. The method of claim 8, further comprising:
retrieving, from the database, a conversation assistance configuration associated with the user, wherein the first conversation assistance information is transmitted to the at least one user device according to the conversation assistance configuration.

11. The method of claim 10, wherein the conversation assistance configuration provides for display of an image that is associated with a name of the first person.

12. The method of claim 10, wherein the conversation assistance configuration provides for presenting the first conversation assistance information as a series of encoded vibration.

13. The method of claim 8, further comprising:
retrieving, from the database, conversation history information collected from at least one previous conversation between the user and the first person; and
determining the first conversation assistance information using the conversation history information.

14. The method of claim 8, wherein the conversation information includes audio data associated with the first person, and wherein the method further comprises:
analyzing the audio data to determine that the conversation information is associated with the conversation involving the user and the first person.

15. A non-transitory machine-readable medium having stored thereon machine-readable instructions executable to cause a machine to perform operations comprising:
in response to receiving conversation information from at least one user device of a user, determining that the conversation information is associated with a conversation involving a user and a first person;
accessing a database to retrieve first conversation assistance information associated with the first person, wherein the first conversation assistance information comprises a name of the first person that is stored in a first format;
determining that the first conversation assistance information corresponds to one or more conversation assistance configurations;
modifying the first conversation assistance information according to the one or more conversation assistance configurations by replacing the name of the first person with data in a second format to obfuscate the first conversation assistance information; and
presenting the modified first conversation assistance information on the at least one user device.

16. The non-transitory machine-readable medium of claim 15, wherein the operations further comprise:
retrieving body measurement data of the user from the at least one user device; and
determining, using the body measurement data, the body measurement data is within a predetermined range indicating a need for conversation assistance in the conversation involving the user and the first person,
wherein the body measurement data of the user includes at least one of heart rate data, temperature data, or perspiration data.

17. The non-transitory machine-readable medium of claim 15, wherein the name of the first person is stored in a first language, and wherein the one or more conversation assistance configurations comprise a configuration to alter the name of the first person in the first conversation assistance information to a corresponding word in a second language that is different from the first language.

18. The non-transitory machine-readable medium of claim 15, wherein the operations further comprise:
determining that the at least one user device does not have a required functionality for presenting the first conversation assistance information according to the one or more conversation assistance configuration; and
in response to determining that the at least one user device does not have the required functionality, presenting the first conversation assistance information as retrieved from the database on the at least one user device.

19. The non-transitory machine-readable medium of claim 17, wherein presenting the modified first conversation assistance information comprises transmitting a signal to the at least one user device of the user to cause the corresponding word in the second language to be presented as a caller identification (ID) on a display of the at least one user device of the user.

20. The non-transitory machine-readable medium of claim 15, the operations further comprising:
determining a communication medium from a plurality of communication mediums for presenting the modified first conversation assistance information on the at least one user device based on one or more hardware components determined to be available on the at least one user device.

* * * * *